United States Patent [19]
Matsumoto

[11] Patent Number: 5,479,227
[45] Date of Patent: Dec. 26, 1995

[54] CAMERA WITH CONTROL OF EXPOSURE AREA SWITCHING MECHANISM

[75] Inventor: Toshio Matsumoto, Tokyo, Japan

[73] Assignee: Canon Kabushiki Kaisha, Tokyo, Japan

[21] Appl. No.: 396,085

[22] Filed: Feb. 28, 1995

Related U.S. Application Data

[63] Continuation of Ser. No. 70,670, Jun. 2, 1993, abandoned.

[30] Foreign Application Priority Data

Jun. 2, 1992 [JP] Japan ................................. 4-141456

[51] Int. Cl.⁶ ................................................. G03B 37/00
[52] U.S. Cl. ................................................ 354/94; 359/159
[58] Field of Search ........................ 354/94, 95, 96, 354/98, 99, 159, 173.1, 173.11, 289.1, 212, 213, 214

[56] References Cited

U.S. PATENT DOCUMENTS 5,128,704  7/1992  Hayashi et al. .................. 354/289.1 X
5,258,790  11/1993  Tanaka .................................. 354/94

FOREIGN PATENT DOCUMENTS 0332176   2/1991  Japan .
3-238439  10/1991  Japan .

Primary Examiner—Howard B. Blankenship
Attorney, Agent, or Firm—Fitzpatrick, Cella, Harper & Scinto

[57] ABSTRACT

A camera including an exposure area switching mechanism for switching an exposure area by an actuating operation of an actuator which is electrically controllable, an exposure operation circuit for executing an exposure operation, and a control circuit for inhibiting, during the exposure operation of the exposure operation circuit, the exposure area from being switched by the actuating operation of the actuator of the exposure area switching mechanism.

68 Claims, 20 Drawing Sheets

CAMERA WITH CONTROL OF EXPOSURE AREA SWITCHING MECHANISM

This application is a continuation of application Ser. No. 08/070,670, filed Jun. 2, 1993, now abandoned.

BACKGROUND OF THE INVENTION

1. Field of the Invention

The present invention relates to a cam having a trimming function capable of setting and varying a photographic image plane size during photography.

2. Description of the Related Art

Two kinds of image plane sizes have mainly been provided in the field of conventional still cameras; a full size (24 mm×36 mm) and a half size (17 mm×24 mm). However, recently, a new size which is called a panorama size (13 mm×36 mm) has also been provided. Since the width of the panorama size is 36 mm, i.e., equal to the width of the full size, it is not necessary to apply a substantial modification to a mechanism for transporting film by one frame at one time. Accordingly, it is possible to realize photography of panorama size by covering an exposure opening for full-size photography by a required amount.

A camera has already been proposed which includes a built-in, movable light blocking member for the purpose of enabling panorama-size photography. The proposed camera is arranged to cover all exposure opening by a required amount in accordance with an operation performed by a photographer. The arrangement of this camera is schematically shown in FIG. 18. The shown arrangement includes a photographic optical system 101, an exposure opening 102 having a size corresponding to the full size, a hole 103 provided in a plane having the exposure opening 102, and light blocking members 104 and 105 provided above and below the exposure opening 102. The respective light blocking members 104 and 105 are turnable about shafts 104a and 105a, and are rotationally urged by means (not shown) to cover upper and lower portions of the exposure opening 102. The shown arrangement also includes an operating member 106 which is supported slidably in the upward and downward directions as viewed in FIG. 18, and the operating member 106 is arranged to be held at each of the upper and lower ends of its sliding stroke by a click mechanism (not shown). The shown state indicates that the operating member 106 is held at its upper click position. The operating member 106 includes an operating projection 106a, a cam portion 106b engageable with an operating projection 104b of the light blocking member 104, and a projection 106c engageable with a first arm 107b of a lever 107. The lever 107 is supported turnably about a hole 107a, and has the first arm 107b and a second arm 107c engageable with a projection 105b of the light blocking member 105. The shown state indicates that the light blocking members 104 and 105 are respectively held at their retracted positions relative to a photographic optical path against an urging force due to a spring or the like by a click force applied by the operating member 106. When the light blocking members 104 and 105 are held in the shown state, if the photographer loads a film and executes photography, full-size photography is carried out. If the photographer slides down the operating member 106 before loading the film, the light blocking members 104 and 105 are respectively made to turn toward the left and the right to cover the upper and lower portions of the exposure opening 102. When the light blocking members 104 and 105 are in the state of covering the upper and lower portions of the exposure opening 102, if the photographer loads the film and executes photography, panorama-size photography is carried out.

The reason why the operating member 106 for size switching is disposed on one side of the exposure opening 102, i.e., at the position where the operating member 106 can be operated only before the film is loaded, is to allow the photographer to perform either one of full-size exposure and panorama-size exposure over the entire film. According to this arrangement, in a processing laboratory, when printing service of a processed film is to be performed, it is possible to transfer the film to a dedicated printing process in accordance with which of the full-size exposure and the panorama-size exposure has been performed.

In the field of lens-shutter types of cameras or the like, it has recently been proposed to provide a camera having a layout in which a size-switching operating member is disposed on the exterior face of the camera so that either of the full-size exposure and the panorama-size exposure can be selected during photography using one film.

However, the above-described related example has the following disadvantages.

(a) In the case of a camera having a focal plane shutter, since the focal plane shutter is disposed in front of the exposure opening of a camera body, it is difficult to dispose turnable light blocking members, an operating member and an associated interlocking mechanism, such as those used in the above-described related example.

(b) In the camera having the focal plane shutter, since a plurality of shutter blades positioned in front of a film are each made from an extremely thin film and are arranged in overlapped form, if any variation occurs in the overlapped state of the shutter blades, light passing through a photographic lens may leak from between the shutter blades and expose the film.

(c) In any of the above-described cameras, during photography, particularly during long-time photography (a low shutter speed), if image-plane-size setting means operates, an underexposure will occur in part of an image plane.

(d) In the camera having the focal plane shutter, since the focal plane shutter is disposed in front of the exposure opening of the camera body, when a back lid is opened, the extremely-thin-film shutter blades of the focal plane shutter are exposed. During film loading, the exposed shutter blades may be soiled due to dust, moisture or the like and the accuracy of shutter operation may be degraded. Otherwise, the shutter blades may be broken by a hand or a leader portion of a film.

(e) In any of the above-described cameras, during special photography, particularly during multiple exposure photography or automatic exposure bracketing photography, if the image-plane-size setting means operates, an underexposure will occur in part of the image plane. Otherwise, since image plane sizes do not become the same during, for example, the automatic exposure bracketing photography, it is impossible to attain the proper effect of the automatic exposure bracketing photography.

SUMMARY OF THE INVENTION

An object of the present invention is to provide a camera capable of inhibiting, during exposure, light blocking members from performing a switching operation for effecting switching between exposure image planes.

Another object of the present invention is to provide a camera capable of inhibiting, during multiple exposure photography, light blocking members from performing a switching operation for effecting switching between exposure image planes.

Another object of the present invention is to provide a camera capable of inhibiting, during automatic exposure bracketing photography, light blocking members from performing a switching operation for effecting switching between exposure image planes.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Figure 1:
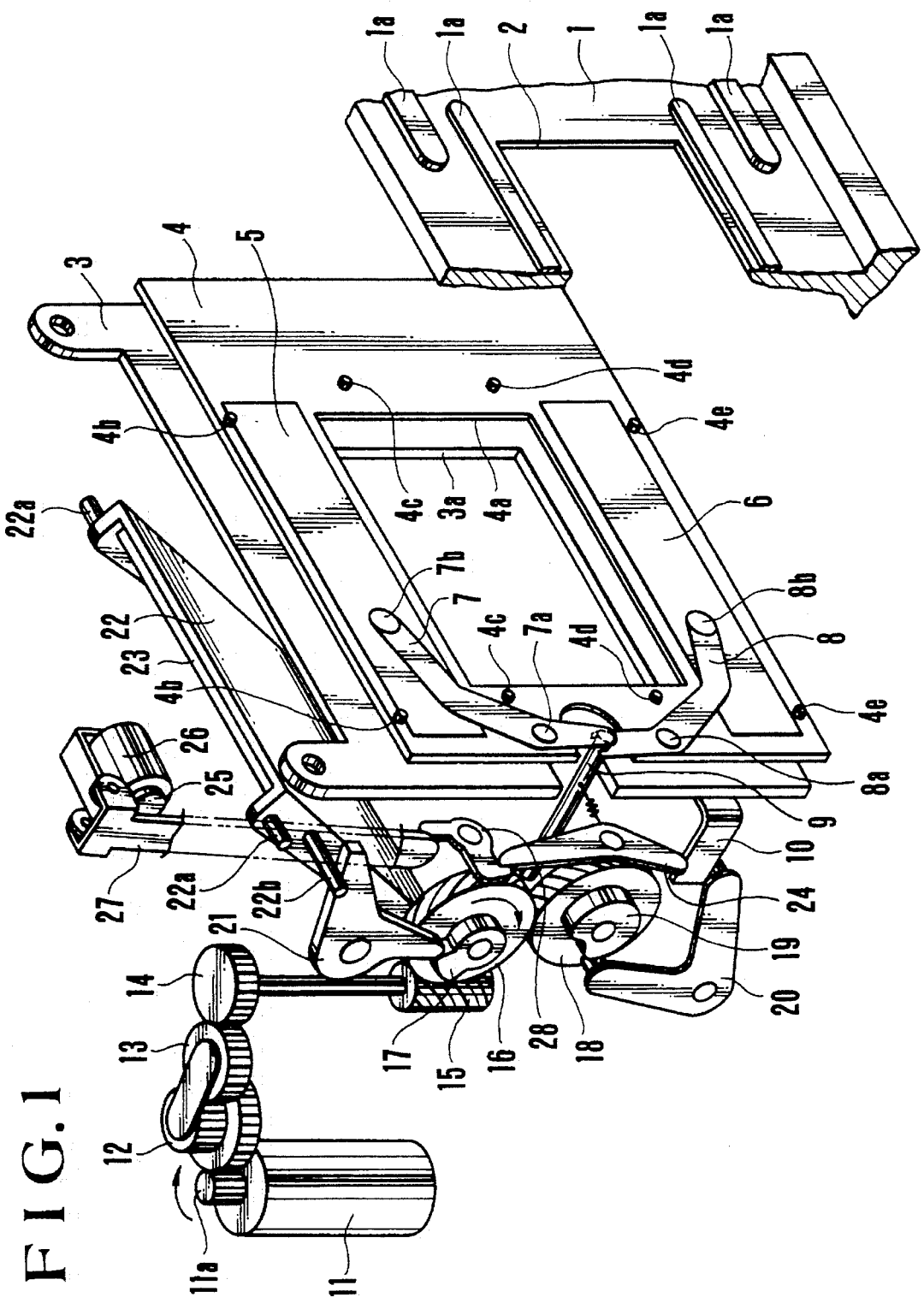
FIG. 1 is a schematic view showing the essential portions of the mechanism of a camera according to a first embodiment of the present invention.

FIG. 1 is a diagrammatic perspective view of the essential portions of the mechanism of a camera according to a first embodiment of the present invention. The shown arrangement includes a body 1 which serves as the structure member of the camera, an exposure opening 2 which is provided in the body 1 and has a size corresponding to a full size of 24 mm×36 mm, guide rails 1a provided on the body 1 for guiding travel of a film, a base 3 of a vertical travel focal plane shutter (hereinafter referred to simply as the shutter), and a cover 4 for the shutter. The base 3 and the cover 4 have exposure openings 3a and 4a, respectively, and are fixed at a predetermined space interval as shown in FIG. 1. This space interval serves as a space in which shutter blades are made to travel. The state shown in FIG. 1 is the state of the arrangement before exposure in which a leading curtain blocks the passage of light through the exposure openings 2, 3a and 4a, but in FIG. 1, the leading curtain is not shown for the sake of simplicity. It is common practice to provide as small a gap as approximately 0.2–0.5 mm between the cover 4 and the body 1. This is because it is desirable to dispose the focal plane shutter as close as possible to a film and because a mirror 23 for transmitting a subject image to a viewfinder which will be described later is disposed between the shutter and a photographic lens. Four pairs of mask stoppers 4b, 4b; 4c, 4c; 4d, 4d and 4e, 4e, which will be described later, are provided on the cover 4. Arms 7 and 8 are supported turnably about holes 7a and 8a, respectively, and a rod 9 provided on one end of the arm 7 engages with a slit formed in one end portion of the arm 8 so that the arms 7 and 8 are interlocked with each other. Masks 5 and 6 are turnably supported by extending ends 7b and 8b of the arms 7 and 8, respectively. The masks 5 and 6 are respectively stopped by the arms 7 and 8 and the mask stoppers 4b and 4e. The rod 9 is urged by a spring, but the operation of the rod 9 is stopped by a lever 24. A lever 10 is a shutter charging lever for charging a shutter mechanism (not shown), and the shutter is held in its charged state by a charging lever 20. The lever 24 is made to turn by being pressed at one end by the shutter charging lever 10. When the shutter charging lever 10 reaches its overcharged state, the lever 24 is brought to a stop by a retaining lever 28, and even after the charging operation of the shutter charging lever 10, the lever 24 is held in the stopped state by the retaining lever 28. Accordingly, even after the completion of the charging operation, a space, in which the lever 24 is allowed to turn when the engagement of the lever 24 with the retaining lever 28 is released, is held between the shutter charging lever 10 and the lever 24. A reversible motor 11 is connected to a gear train made up of a pinion gear 11a, a sun gear 12, a planetary gear 13, a transmission gear 14 and other associated parts. Only when the motor 11 is driven to rotate in the direction indicated by an arrow (hereinafter referred to as the forward direction), the planetary gear 13 meshes with the transmission gear 14, whereas only when the motor 11 is driven to rotate in the opposite direction (hereinafter referred to as the reverse direction), the planetary gear 13 rotates about the sun gear 12 and is connected to a film transporting mechanism (not shown). The transmission gear 14 is coupled to a worm gear 15 which rotates integrally therewith, and the rotation of the worm gear 15 is transmitted to a wheel gear 16 and then to a wheel gear 18, so that when the motor 11 is driven to rotate in the forward direction, the wheel gear 16 is rotated in the direction indicated by the arrow shown on the wheel gear 16 of FIG. 1. A cam 17 is a mirror cam which rotates integrally with the wheel gear 16, and a cam 19 is a charging cam which rotates integrally with the wheel gear 18. In the shown state, the cam top portion of the charging cam 19 is maintained in contact with the charging lever 20 to hold the shutter in the charged state as described above.

A mirror receiving plate 22 supports the mirror 23 for transmitting a subject image to the above-described viewfinder, and is supported turnably about a shaft 22a. When a mirror lever 21 is pressed by the mirror cam 17, the mirror lever 21 rotates to turn the mirror receiving plate 22 toward the right via a pin 22b provided on the mirror receiving plate 22. In FIG. 1, the mirror cam 17 and the mirror lever 21 are not in contact with each other, and the mirror receiving plate 22 is placed at a position where the subject image is reflected to a viewfinder optical system. A yoke 25, a coil 26 and an armature 27 constitute an electromagnet unit. When the coil 26 is energized, the yoke 25 attracts the armature 27 to cause it to turn toward the left, so that the extending end of the armature 27 causes the retaining lever 28 to turn toward the right, thereby releasing the engagement of the retaining lever 28 with the lever 24.

Figure 2:
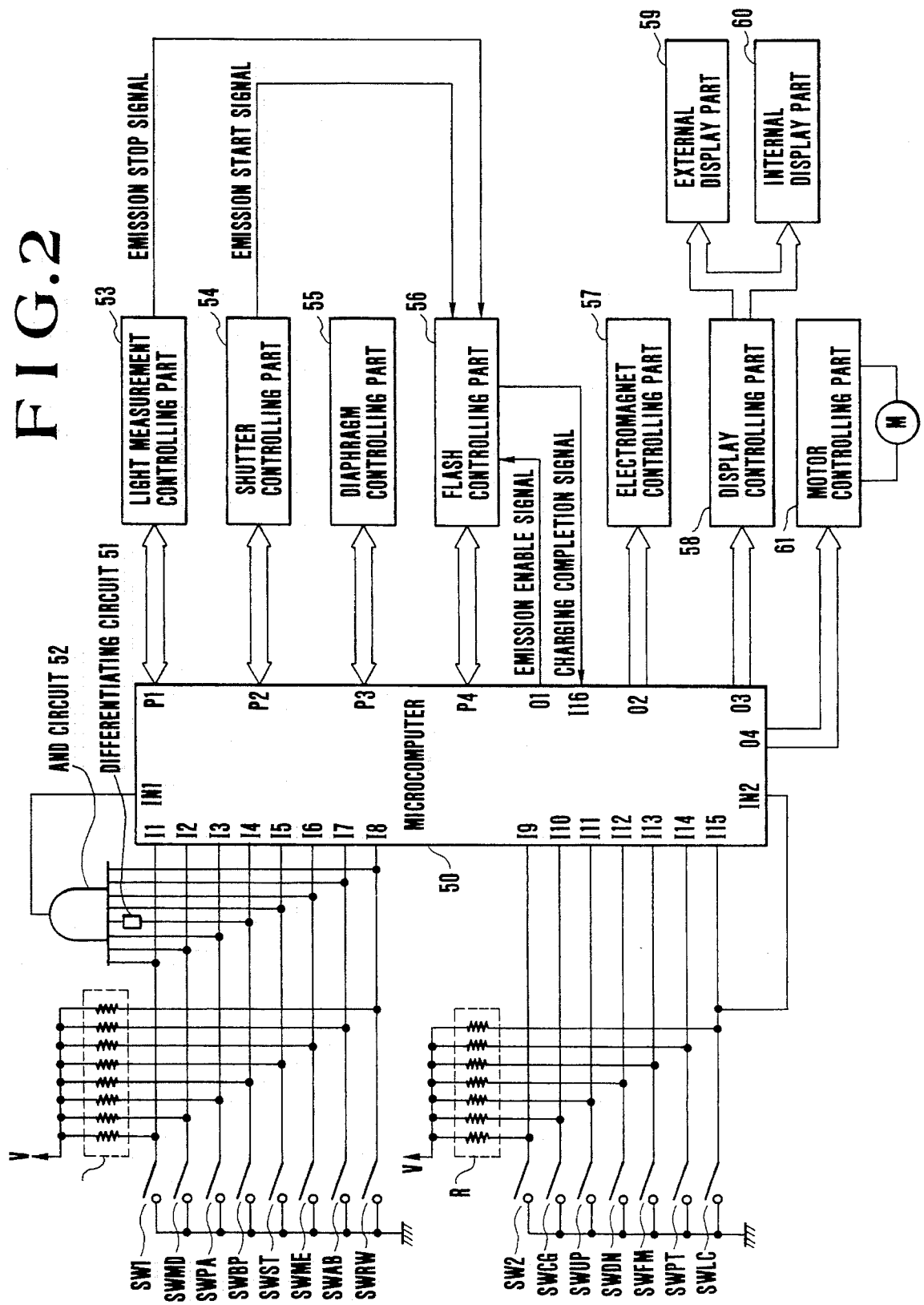
FIG. 2 is a circuit diagram for operating the mechanism shown in FIG. 1.

FIG. 2 shows one example of a control circuit provided in the camera according to the first embodiment of the present invention. A microcomputer 50 has input ports I1 to I16 and output ports O1 to O4 as well as a plurality of input/output ports P1 to P4, and switches or controlling parts which will be described below are connected to the respective ports. The microcomputer 50 controls the individual controlling parts in accordance with signals inputted to the respective input ports I1 to I15. The shown control circuit also includes a switch SW1 which is first turned on when a shutter release button of the camera is depressed, a switch SWMD which is turned on when a photographic mode switching button of the camera is pressed, a switch SWPA which is disposed at a position where it can be operated even after a film is loaded, and which is turned on when a button for executing switching between panorama photography and normal photography is pressed, a switch SWBP which is turned on when a back lid is closed, and a switch SWST which is turned on when a built-in flash unit is popped up. The shown control circuit further includes a switch SWME which is turned on when a multiple exposure mode button (not shown) is pressed, a switch SWAB which is turned on when an automatic exposure bracketing mode button (not shown) is pressed, a switch SWRW which is turned on when a film rewinding button is pressed, a switch SW2 which is turned on when the shutter release button is further depressed after the switch SW1 is turned on, a switch SWCG which is on during the state of the shutter charging operation being completed, and switches SWUP and SWDN which are respectively turned on in response to the operation of depressing an up button and a down button. The up button and the down button serve as operating members for updating photographic data which will be described later. In use, for example, if a shutter priority (Tv priority) mode is selected as a photographic mode, a shutter time is shifted to a higher-shutter-speed side or to a lower-shutter-speed side by operating the up button or the down button. If an aperture priority (Av priority) mode is selected as a photographic mode, an aperture value is shifted to a smaller aperture diameter side or to an open aperture side by operating the up button or the down button. The shown arrangement further includes a switch SWFM which is interlocked with a film winding operation and is turned on each time the film is advanced by one frame, a switch SWPT which is turned on when a film cartridge is loaded into the camera, and a switch SWLC which is interlocked with an operating member for switching the camera between an inoperative state and an operative state and which is turned on when the inoperative state is selected. Each of the switches SW1, SWMD, SWPA, SWBP, SWST, SWME, SWAB, SWRW, SW2, SWCG, SWUP, SWDN, SWFM, SWPT and SWLC is grounded at one end, and the other ends are respectively connected to the input ports I1 to I15 of the microcomputer 50. Since each of the input ports I1 to I15 is connected to a + voltage via a corresponding resistor R, if the switches SW1, SWMD, SWPA, SWBP, SWST, SWME, SWAB, SWRW, SW2, SWCG, SWUP, SWDN, SWFM, SWPT and SWLC are off, input voltages at the respective input ports I1 to I15 are pulled up to their "H" levels. If they are on, the input voltages at the corresponding input ports I1 to I15 go to their "L" levels. The input ports I1, I2, I3, I5, I6, I7 and I8 are directly connected to an AND circuit 52, while the input port I4 is connected to the AND circuit 52 via a differentiating circuit 51. The output of the AND circuit 52 is connected to an interrupt terminal IN1 of the microcomputer 50, while the input port I15 is connected to an interrupt terminal IN2. Accordingly, if the switch SW1, SWMD, SWPA, SWST, SWME, SWAB or SWRW is turned on, or if the state of the switch SWBP changes from "on" to "off" or from "off" to "on", the input signal from the AND circuit 52 to the interrupt terminal IN1 changes from the "H" level to the "L" level, whereby an interrupt is applied to the interrupt terminal IN1. Regarding the interrupt terminal IN2, if the switch SWLC is turned on and the input signal from the switch SWLC to the interrupt terminal IN2 changes from the "H" level to the "L" level, an interrupt is applied to the interrupt terminal IN2. A light measurement controlling part 53 includes light measuring means for the camera, and is connected to the microcomputer 50 at the input/output port P1. The light measurement controlling part 53 measures light passing through the photographic lens in response to a signal supplied from the microcomputer 50 and outputs the result to the microcomputer 50. Also, if the measured-light value reaches a predetermined value, the light measurement controlling part 53 outputs an emission stop signal for stopping an emission of the flash unit to a flash controlling part 56. A shutter controlling part 54 is connected to the input/output port P2 of the microcomputer 50, and controls the leading curtain as well as a trailing curtain. Also, upon completion of a travel of the leading curtain, the shutter controlling part 54 outputs an emission start signal for starting an emission of the flash unit to the flash controlling part 56. A diaphragm controlling part 55 controls a diaphragm provided in the photographic lens, and is connected to the microcomputer 50 at the input/output port P3. The diaphragm controlling part 55 stops down the diaphragm to a predetermined aperture value or opens the diaphragm to a fully open aperture value, in accordance with a signal from the microcomputer 50, and outputs an operation end signal to the microcomputer 50. The flash controlling part 56 transmits and receives zoom information, a charging start signal or the like to and from the microcomputer 50 through the input/output port P4. The flash controlling part 56 also receives an emission enable signal from the microcomputer 50 through the output port O1, and outputs a charging completion signal to the input port I16. An electromagnet controlling part 57 is connected to the output port O2 of the microcomputer 50, and controls the coil 26 of the electromagnet unit shown in FIG. 1 in accordance with a signal supplied from the output port O2. A display controlling part 58 of the camera controls an external display part 59 of the camera and a display part 60 incorporated in the viewfinder, in accordance with a signal supplied from the output port O3 of the microcomputer 50. A motor controlling part 61 is connected to the output port O4 of the microcomputer 50, and drives the motor 11 of FIG. 1 in accordance with a signal supplied from the microcomputer 50.

Figure 3:
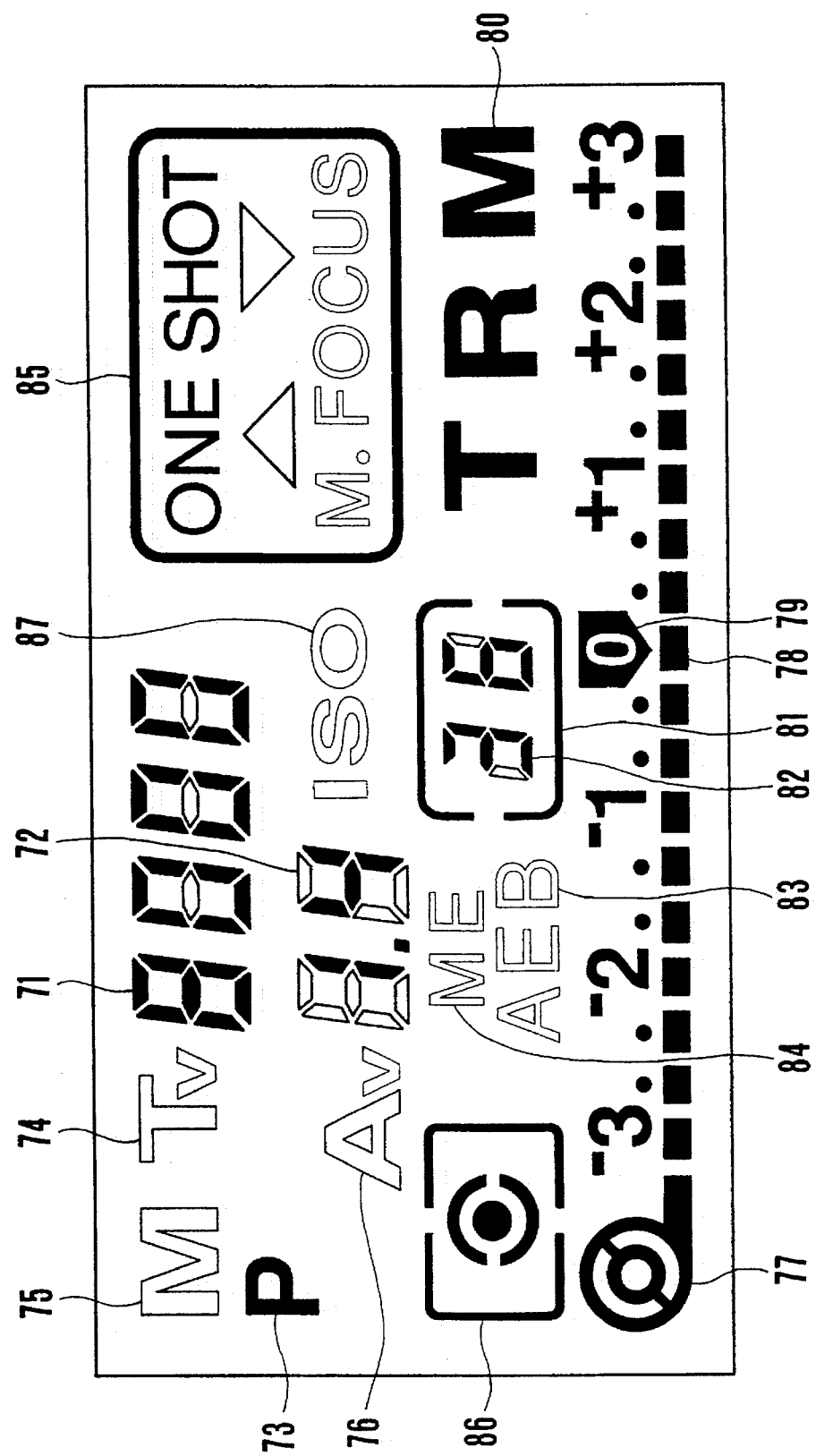
FIG. 3 is a view showing a display example controlled by the circuit shown in FIG. 2.
Figure 4:
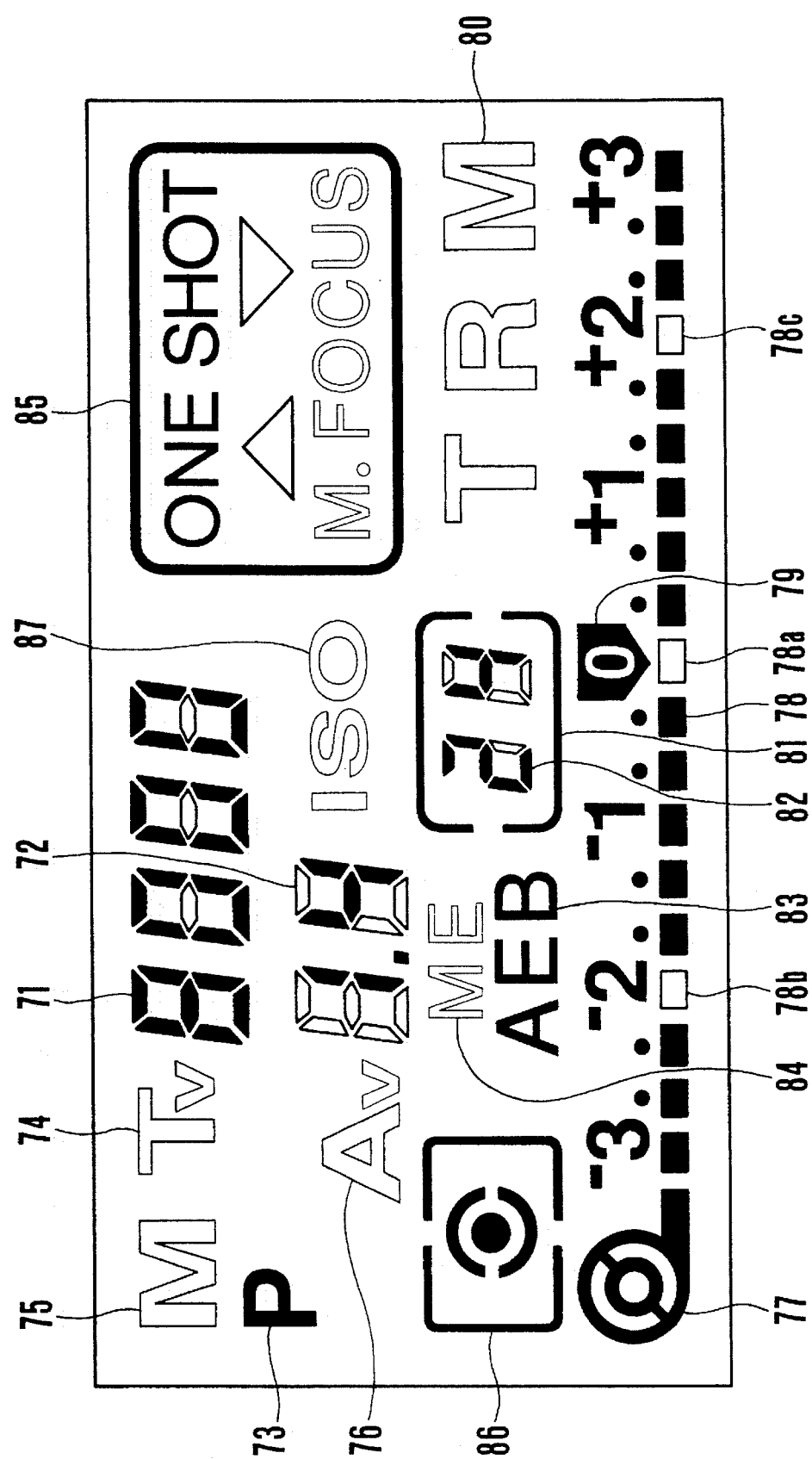
FIG. 4 is a view showing another display example controlled by the circuit shown in FIG. 2.
Figure 5:
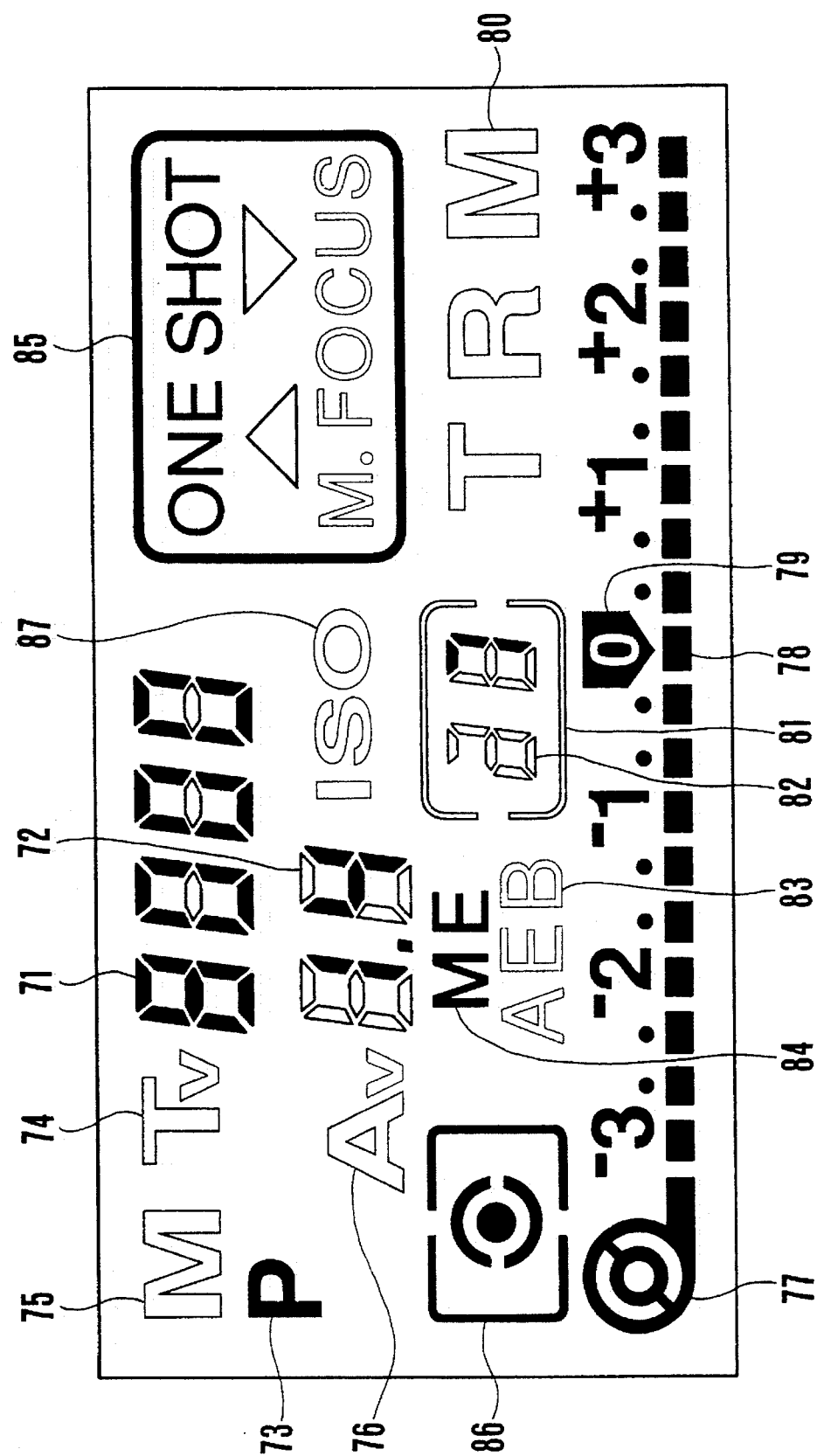
FIG. 5 is a view showing another display example controlled by the circuit shown in FIG. 2.

FIGS. 3, 4 and 5 show one example of the external display part 59 of the camera according to the first embodiment of the present invention. The external display part 59 is made from a liquid crystal device, and in FIGS. 3, 4 and 5, characters, pictographs and other segments which are painted in black represent that they are visibly displayed on the external display part 59, while the remaining characters, pictographs and segments which are drawn in outline form represent that they are not visibly displayed on the external display part 59. A display portion 71 represents a shutter time and a display portion 72 represents an aperture value, and 1/8000 second and F1.4 are visibly displayed in the example of FIG. 3. Display portions 73, 74, 75 and 76 represent different photographic modes, and "P" represents a program mode, "Tv" represent the shutter priority mode, "Av" represents the aperture priority mode, and "M" represents a manual mode. Although each of FIGS. 3, 4 and 5 shows that the program mode is selected, each time the switch SWMD is pressed once, the symbols P, Tv, Av and M are sequentially selected so that they can be visibly displayed in the order of P→Tv→Av→M. A film cartridge mark 77 is made visible when the switch SWPT is turned on. A dot group 78 is a dot group for displaying the state of film and an exposure compensation value, and is made up of a plurality of dots "o". If a film is loaded and the camera is placed in its photography standby state, all dots of the dot group 78 are normally visibly displayed as shown in FIG. 3. Regarding exposure compensation, the amount of exposure compensation is displayed by visibly displaying a dot or dots "o" corresponding to a compensation value (−1, −2, −3, +1, +2, ∓ or 0) which is indicated by an amount-of-exposure-compensation display 79. Incidentally, the amount-of-exposure-compensation display 79 is a display of an EV value. A display portion 80 serves as a display indicating whether the panorama photography is set, and the display portion 80 of FIG. 3 indicates that the panorama photography is set. During this state, if the switch SWPA is turned on, the characters "TRM" disappear to indicate that the normal full-size photography is set. Subsequently, each time the switch SWPA is turned on, the characters "TRM" are made alternately visible and invisible. A frame 81 is a frame in which to display the state of counting of a film counter 82, and during a normal film counter display, the number of nonexposed frames of the film is displayed by the film counter 82 and the state-of-counting display frame 81 is simultaneously displayed. Also, as shown in FIG. 5, if a multiple exposure photography mode is set, a multiple exposure mode display 84 is visibly displayed, the film counter 82 displays the number of times of exposures for one multiple exposure cycle, and the state-of-counting display frame 81 is made invisible to indicate that the multiple exposure photography mode is set. A display portion 83 displays that an automatic exposure bracketing photography mode (hereinafter referred to as the AEB mode) is set, and if an AEB mode setting button is pressed, the switch SWAB is turned on and an AEB mode settable state is selected. During this state, if the up button or the down button is pressed, the switch SWUP or the switch SWDN is turned on.

If the switch SWUP is turned on once, the amount of exposure is set to increase by a ⅓ step (EV value) with respect to a correct exposure value, and if the switch SWDN is turned on once, the setting is changed in the direction in which the amount of exposure decreases by a ⅓ step (EV value) with respect to the set amount of exposure. The amount of exposure thus set is displayed by making invisible a particular dot "o" of the dot group 78 which corresponds to the compensation value (−1, −2, −3, +1, +2, +3 or 0) which is indicated by the amount-of-exposure-compensation display 79. FIG. 4 shows a display provided when the AEB mode is set, and also shows that the amount of exposure is set to vary in three steps: −2 EV, 0 EV and +2 EV. Dots "o" 78b, 78a and 78c of the dot group 78 for displaying an exposure compensation value, which correspond to the respective set amounts of exposures, are made invisible and the characters "AEB" of the AEB mode display 83 are made visible. The display portion 84 serves as a mark for displaying whether the multiple exposure photography mode (hereinafter referred to as the ME mode) is set, and if the ME mode setting button is pressed, the switch SWME is turned on and an ME mode settable state is selected. During this state, if the up button or the down button is pressed, the switch SWUP or SWDN is turned on. If the switch SWUP is turned on once, the number of times of exposures for one multiple exposure cycle is set to increase, and if the switch SWDN is turned on once, the setting is changed in the direction in which the set number of times of exposures for one multiple exposure cycle decreases. The thus-set number of times of exposures for one multiple exposure cycle is displayed by the film counter 82, and to discriminate between the display of the number of times of exposures for one multiple exposure cycle and the normal film counter display, the state-of-counting display frame 81 is made invisible and the characters "ME" of the ME mode display 84 are made visible. A display portion 85 serves as a state-of-focus display indicating which of automatic focus and manual focus is selected in an autofocus camera, and a display portion 85 serves as a light measurement display mark.

The operation Of the camera which is controlled by the above-described control circuit will be described below with reference to the flowchart of FIGS. 6 through 8.

Figure 6:
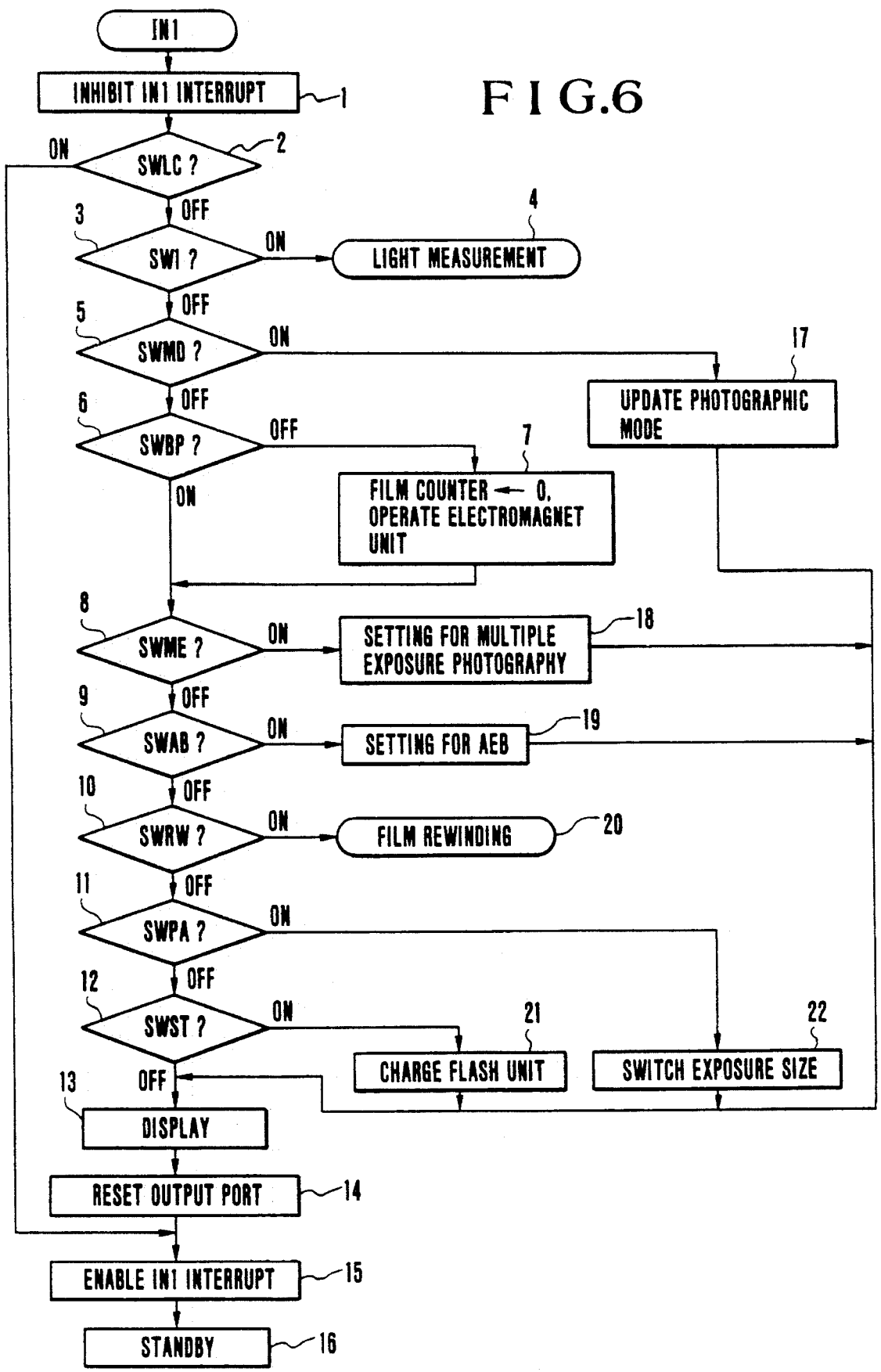
FIG. 6 is a flowchart of an interrupt routine executed by the circuit shown in FIG. 2.

FIG. 6 is an interrupt routine showing an interrupt applied to the interrupt terminal IN1. As described previously, if the switch SW1, SWMD, SWPA, SWST, SWME, SWAB or SWRW is turned On, or if the state of the switch SWBP changes from "on" to "off" or from "off" to "on", an interrupt is applied to the interrupt terminal IN1 and, in Step #1, application of a further interrupt to the interrupt terminal IN1 is inhibited. Then, in Step #2, it is determined whether the switch SWLC is on or off. If the switch SWLC is on, since this indicates that the camera is held in the inoperative state by the operating member, the process proceeds to Step #15 without performing anything. If the switch SWLC is off, the process proceeds to Step #3. In Step #3, a decision is made as to the state of the switch SW1. If the switch SW1 is on, since this indicates that the shutter release button of the camera has been operated, the process proceeds to Step #4 which will be described later and enters a light measurement routine. If the switch SW1 is off, the process proceeds to Step #5. In Step #5, a decision is made as to the state of the switch SWMD, and if the switch SWMD is on, the process proceeds to Step #17. In Step #17, one photographic mode, such as the program mode or the shutter priority mode, is changed to another photographic mode in the predetermined order as described previously, and then the process proceeds to Step #13. If it is determined in Step #5 that the switch SWMD is off, the process proceeds to Step #6. Since the switch SWBP is arranged to interlock with the opening and closing of the back lid, if the switch SWBP is off in Step #6, this indicates that the back lid is open. Accordingly, the process proceeds to Step #7, in which the content of the film counter is reset to 0 and the electromagnet unit for switching an exposure size (for setting a panorama size) is operated so that the exposure opening 2 (3a, 4a) is covered by the masks 5 and 6 to protect the shutter blades. After that, the process proceeds to Step #8. If the switch SWBP is on in Step #6, since this indicates that the back lid is closed, the process proceeds to Step #8. In Step #8, a decision is made as to the state of the switch SWME. If the switch SWME is on, since this indicates that the multiple exposure photography mode is set, the process proceeds to Step #18. In Step #18, the number of times of exposures for one multiple exposure cycle is set in the previously-described manner, and then the process proceeds to Step #13. If the switch SWME is off in Step #8, the process proceeds to Step #9. In Step #9, a decision is made as to the state of the switch SWAB. If the switch SWAB is on, since this indicates that the AEB mode is set, the process proceeds to Step #19. In Step #19, the amount of correction to be applied to a correct exposure value is set in the previously-described manner, and then the process proceeds to Step #13. If the switch SWAB is off in Step #9, the process proceeds to Step #10. In Step #10, a decision is made as to the state of the switch SWRW. If the switch SWRW is on, since this indicates that a film rewinding operation is set, the process proceeds to Step #20, in which a film rewinding sequence which will be described later is executed. If the switch SWRW is off in Step #10, the process proceeds to Step #11. In Step #11, a decision is made as to the state of the switch SWPA. If the switch SWPA is on, since this indicates that an operation for switching the exposure size (an operation for performing switching between the panorama size and a normal size) is performed, the process proceeds to Step #22 and the switching of the exposure size between the panorama size and the normal size is performed. Then, the process proceeds to Step #13. If the switch SWPA is off in Step #11, the process proceeds to Step #12, in which a decision is made as to the state of the switch SWST. If the switch SWST is on, since this indicates that the flash unit is popped up, the process proceeds to Step #21 and a capacitor for storing the electric charge required to cause an emission of the flash unit is charged. Then, the process proceeds to Step #13. In Step #13, the content set by the switch SWMD, SWBP, SWME, SWAB, SWPA or SWST is displayed on the external display part 59 or the internal display part 60. Then, in Step #14, the output port of the microcomputer 50 is reset, and after an interrupt applied to the interrupt terminal IN1 is enabled, the camera is set to its standby state in Step #16.

Figure 7:
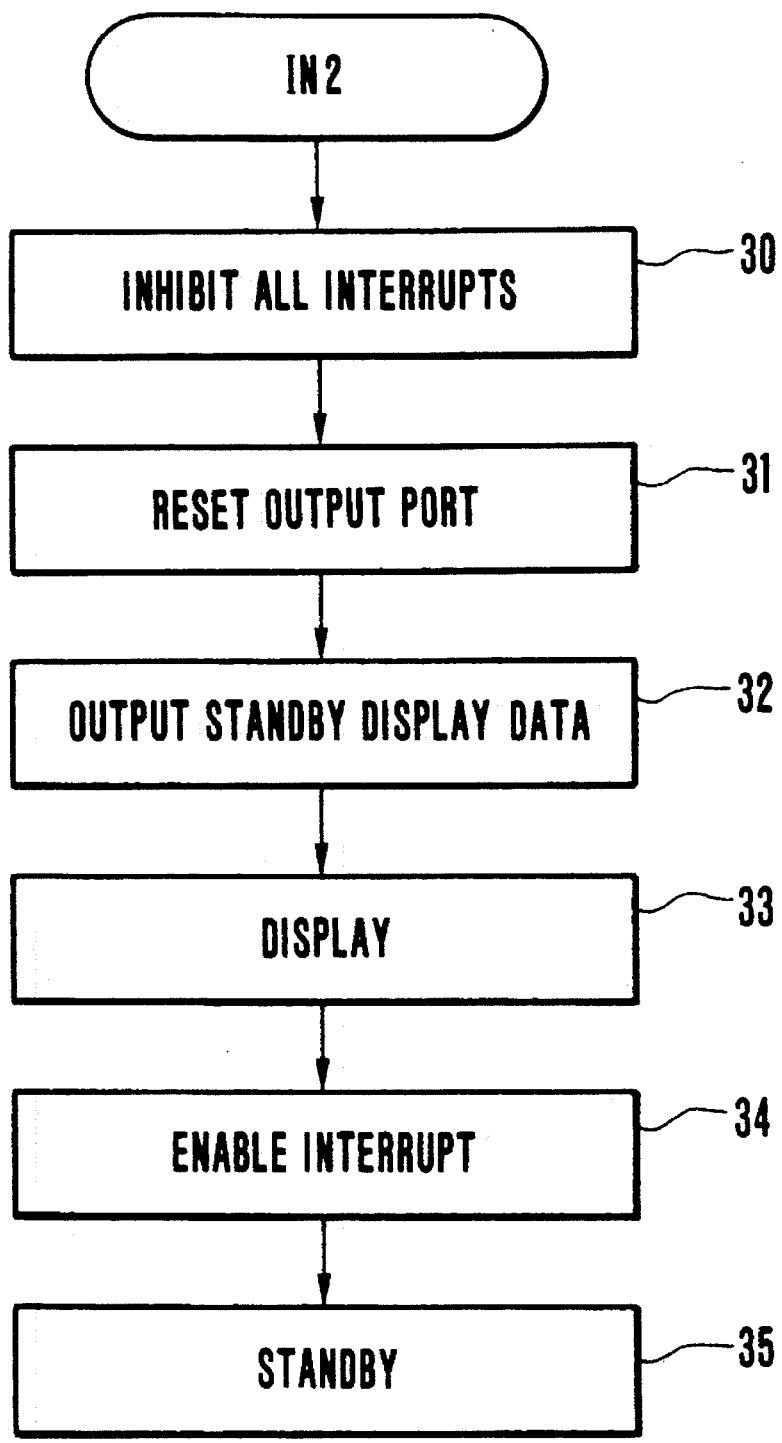
FIG. 7 is a flowchart of another interrupt routine executed by the circuit shown in FIG. 2.

FIG. 7 shows a routine which is executed when an interrupt is applied to the interrupt terminal IN2. When the switch SWLC is turned on, an interrupt is applied to the interrupt terminal IN2, and all interrupts are inhibited in Step #30. In Step #31, the output port of the microcomputer 50 is reset, and in Step #32, standby display data is outputted to the display controlling part 58, and in Step #33, a standby display is provided. By the above-described operation, the controlling parts connected to the microcomputer 50 stop their respective operations even while they are operating. Then, in Step #34, the interrupt is enabled, and in Step #35, the camera is set to the standby state.

Figure 8:
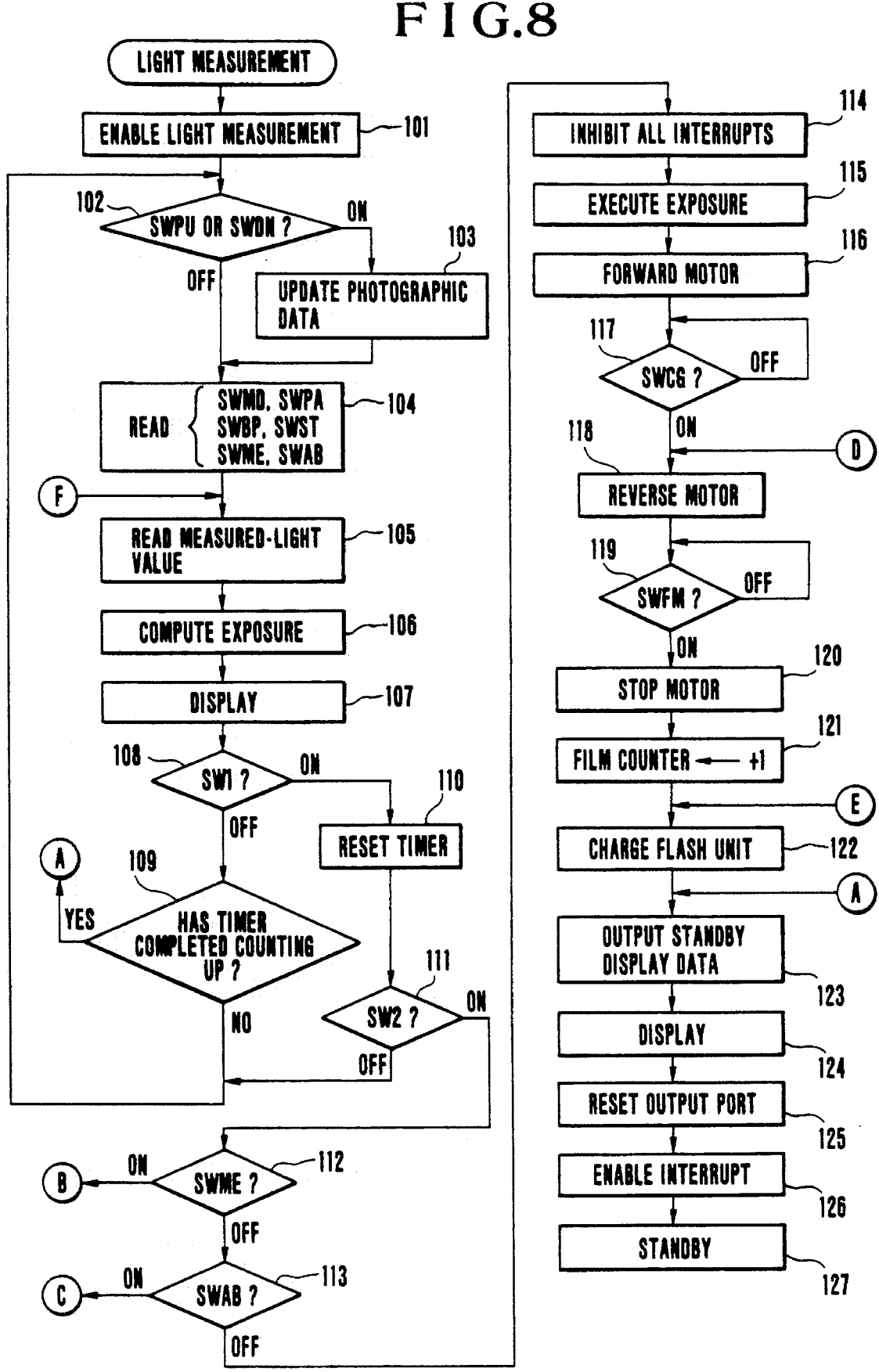
FIG. 8 is a flowchart of a light measurement routine executed by the circuit shown in FIG. 2.
Figure 9:
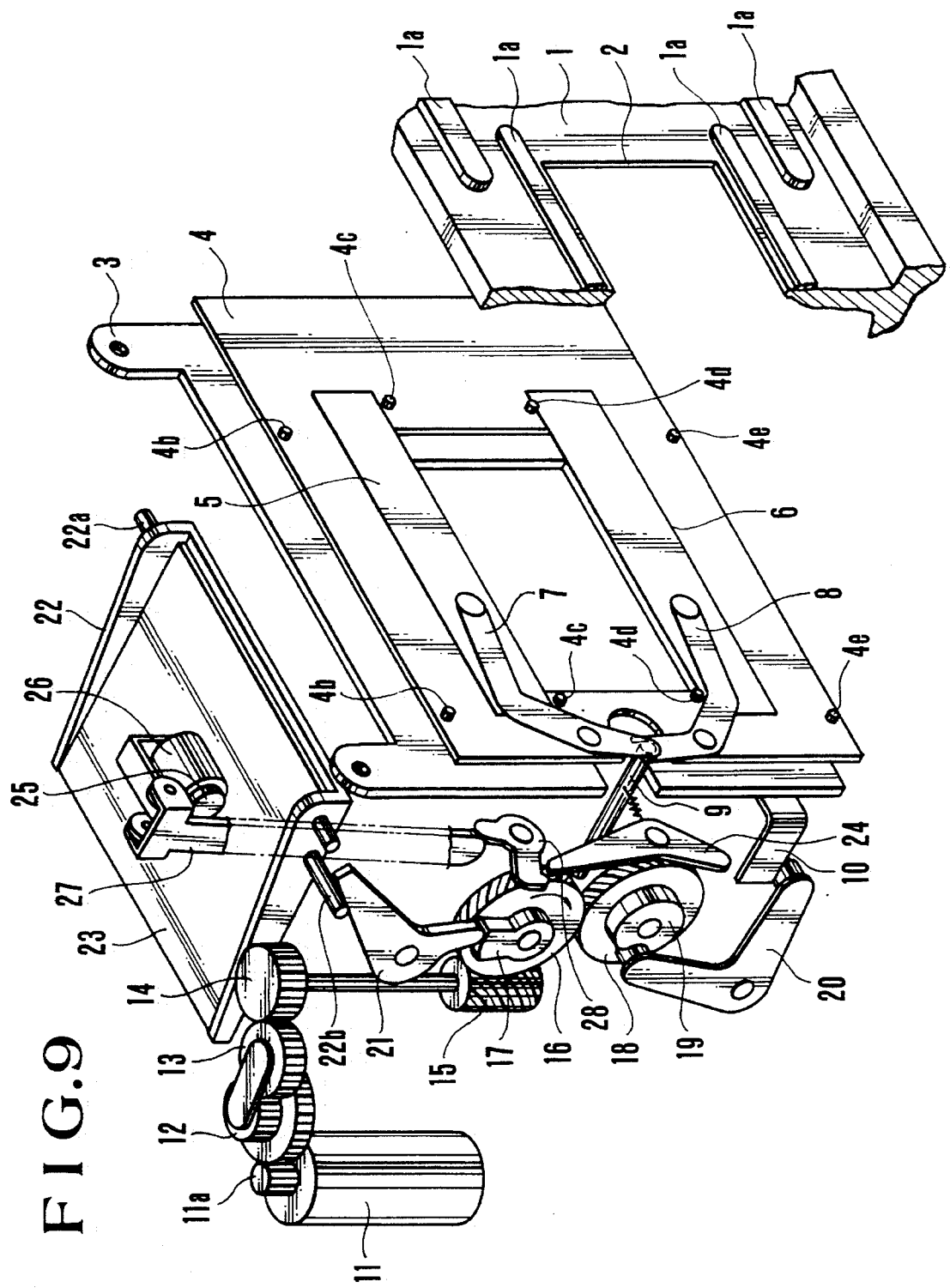
FIG. 9 is a schematic view which serves to explain the operation of the mechanism shown in FIG. 1.

FIG. 8 shows the light measurement routine which is executed when the process enters Step #4. In Step #101, a signal for enabling light measurement is transmitted to the light measurement controlling part 53 to start a light measurement. In Step #102, it is determined whether the switch SWUP or SWDN is on. If the switch SWUP or SWDN is on, the process proceeds to Step #103, in which photographic data is updated in accordance With a selected photographic mode; for example, a shutter speed is updated in the case of the shutter priority mode or an aperture value is updated in the case of the aperture priority mode. Then, the process proceeds to Step #104. In Step #104, a decision is made as to the state of the switch SWMD, SWPA, SWBP, SWST, SWME or SWAB, and a processing similar to the flow shown in FIG. 6 is performed. In Step #105, the result of the light measurement is read from the light measurement controlling part 53, and in Step #106, an aperture value or a shutter speed for use in actually performing exposure is computed from the result of the light measurement, a film speed or the like. The result of the computation is displayed in Step #107. In Step #108, it is determined whether the switch SW1 is on. If the switch SW1 is on, the process proceeds to Step #110, in which a timer is reset (i.e., the timer which is counting is restarted), and in Step #111, a decision is made as to the state of the switch SW2. If the switch SW2 is off, the process returns to Step #102. If the switch SW1 is off in Step #108, it is determined in Step #109 whether the timer has completed counting up. If the timer has not yet completed counting up, the process returns to Step #102. If the timer has completed counting up, the process jumps to Step #123 through a connection A in order to set the camera to the standby state. Accordingly, if the switch SW1 is on and the switch SW2 is off, or as long as the timer is counting a predetermined time even if the switch SW1 is off, Steps #102 through #107 are repeated. If it is determined in Step #111 that the switch SW2 is on, the process proceeds to Step #112. In Step #112, a decision is made as to the state of the switch SWME. If the switch SWME is on, the process proceeds to a connection B to execute a multiple exposure photography sequence which will be described later. If the switch SWME is off, the process proceeds to Step #113. In Step #113, a decision is made as to the state of the switch SWAB. If the switch SWAB is on, the process proceeds to a connection C to execute an AEB photography mode sequence which will be described later. If the switch SWAB is off, the process proceeds to Step #114. In the case where the multiple exposure photography mode or the AEB photography mode is set, no normal photography sequence is performed and a sequence exclusively prepared for the multiple exposure photography mode or the AEB photography mode is executed. If neither of them is set, the process proceeds to Step #114 and an actual exposure operation is started in accordance with the normal photography sequence. In Step #114, all interrupts are inhibited, and in Step #115, exposure is executed on the basis of the value obtained in Step #106. Although the exposure operation will be described in detail later, the state of the arrangement at the end of the exposure operation is shown in FIG. 9. FIG. 9 shows the state of the arrangement when the panorama photography is executed, and the difference between FIG. 1 and FIG. 9 will be described below. Referring to FIG. 9, each of the wheel gears 16 and 18 is rotated by a predetermined amount by the motor 11, the mirror cam 17 holds the mirror 23 in its upper retracted position by means of a mirror lever 21, and the charging cam 19 holds each of the charging lever 20 and the shutter charging lever 10 in the state of being released from the charged state. Since the exposure operation has been ended, the leading curtain (not shown) is retracted from the exposure opening 2 (3a, 4a), and the exposure opening 2 (3a, 4a) is covered by the trailing curtain. Since the engagement of the retaining lever 28 with the lever 24 is released and the charging by the shutter charging lever 10 is released, the lever 24 is rotated up to its left-end position and the arms 7 and 8 are respectively rotated to their right- and left-end positions where the marks 5 and 6 are kept in contact with the corresponding mask stoppers 4c and 4d, and light only in the upper and lower portions of the exposure opening 2 is blocked. If the motor 11 is driven in the forward direction in Step #116 during the above-described state, the wheel gear 16 rotates in the direction of the arrow shown on the wheel gear 16 in FIG. 9, the mirror 23 moves down and the shutter charging lever 10 is again charged. If it is determined in Step #117 that the switch SWCG is turned on, i.e., the shutter charging operation has been completed, the motor 11 is reversed in Step #118. The planetary gear 13 rotates about the sun gear 12 to make connection with a film winding system (not shown), thereby winding the film. If it is determined in Step #119 that the switch SWFM is on, i.e., the film has been wound by one frame, the motor 11 is stopped in Step #120, and in Step #121, 1 is added to the count value of the film counter. Then, in Step #122, the flash unit is charged, and in Step #123, standby display data is prepared. In Step #124, the standby display data is displayed, and in Step #125, the output port of the microcomputer 50 is reset. In Step #126, the interrupt applied to the interrupt terminal IN1 or IN2 is enabled, and in Step#127, the camera is set to the standby state, and the arrangement returns to the state shown in FIG. 1.

Photography for one frame is completed in the above-described manner. The difference between photographic sequences based on the respective selected exposure sizes will be described below in accordance with the flow of the flowchart shown in FIGS. 10 through 15.

Figure 10:
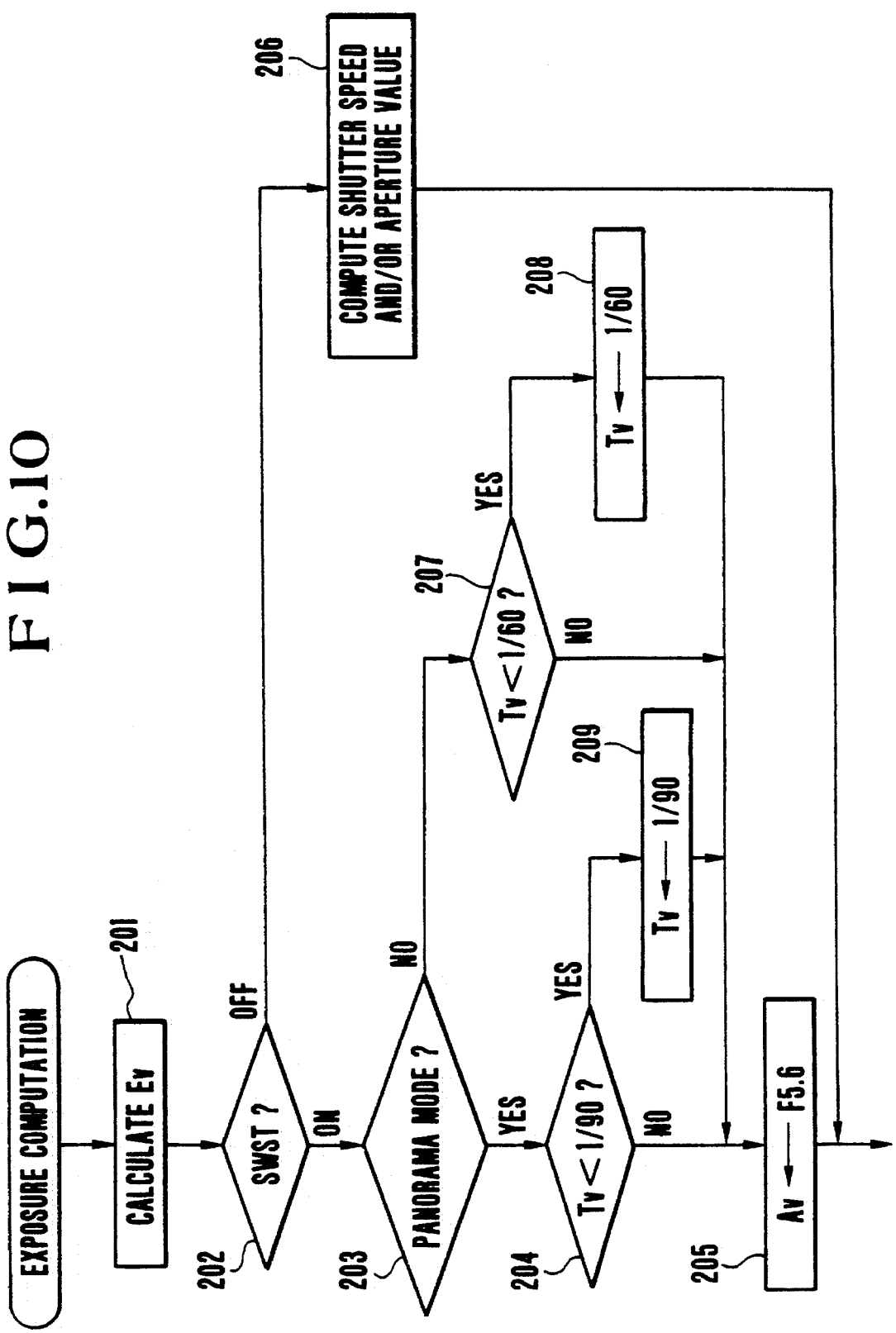
FIG. 10 is a flowchart of an exposure computation performed by the circuit shown in FIG. 2.

FIG. 10 is a flowchart showing in detail Step #106 of the flowchart shown in FIG. 8. In Step #201, the amount of correct exposure EV is obtained from the result of the light measurement. In Step #202, a decision is made as to the state of the switch SWST, and if the switch SWST is on, i.e., if the flash unit is pepped up, the process proceeds to Step #203. In Step #203, it is determined whether a panorama mode for effecting exposure corresponding to a panorama size is selected. If the panorama mode is selected, the process proceeds to Step #204. In Step #204, it is determined whether the shutter speed set in the shutter priority mode or the manual mode is higher than 1/90 second. If the shutter speed is higher than 1/90 second, the shutter speed is set to 1/90 second in Step #209. If the shutter speed is not 1/90 second, the process proceeds to Step #205, in which the aperture value is set to F5.6. If it is determined in Step #202 that the switch SWST is off, i.e., the flash unit is not popped up, the process proceeds to Step #206. In Step #206, a shutter speed and an aperture value are computed from the EV value in accordance with the set photographic mode by using an APEX expression. If the shutter priority mode is set, an aperture value is computed; if the aperture priority mode is set, a shutter speed is computed; or if the program mode is set, a shutter speed and an aperture value are computed in accordance with a predetermined program. Then, the process proceeds to Step #107 of FIG. 8. If it is determined in Step #203 that the panorama mode is not selected, the process proceeds to Step #207, in which it is determined whether the set shutter speed is higher than 1/60 second. If it is higher than 1/60 second, the shutter speed is set to 1/60 second, whereas if it is lower than 1/60 second, the process proceeds to Step #205 without changing the shutter speed. Accordingly, the shutter speed of flash photography is made 1/90 second or below if the panorama mode is selected and 1/60 second or below if a full-size mode is selected.

Figure 11:
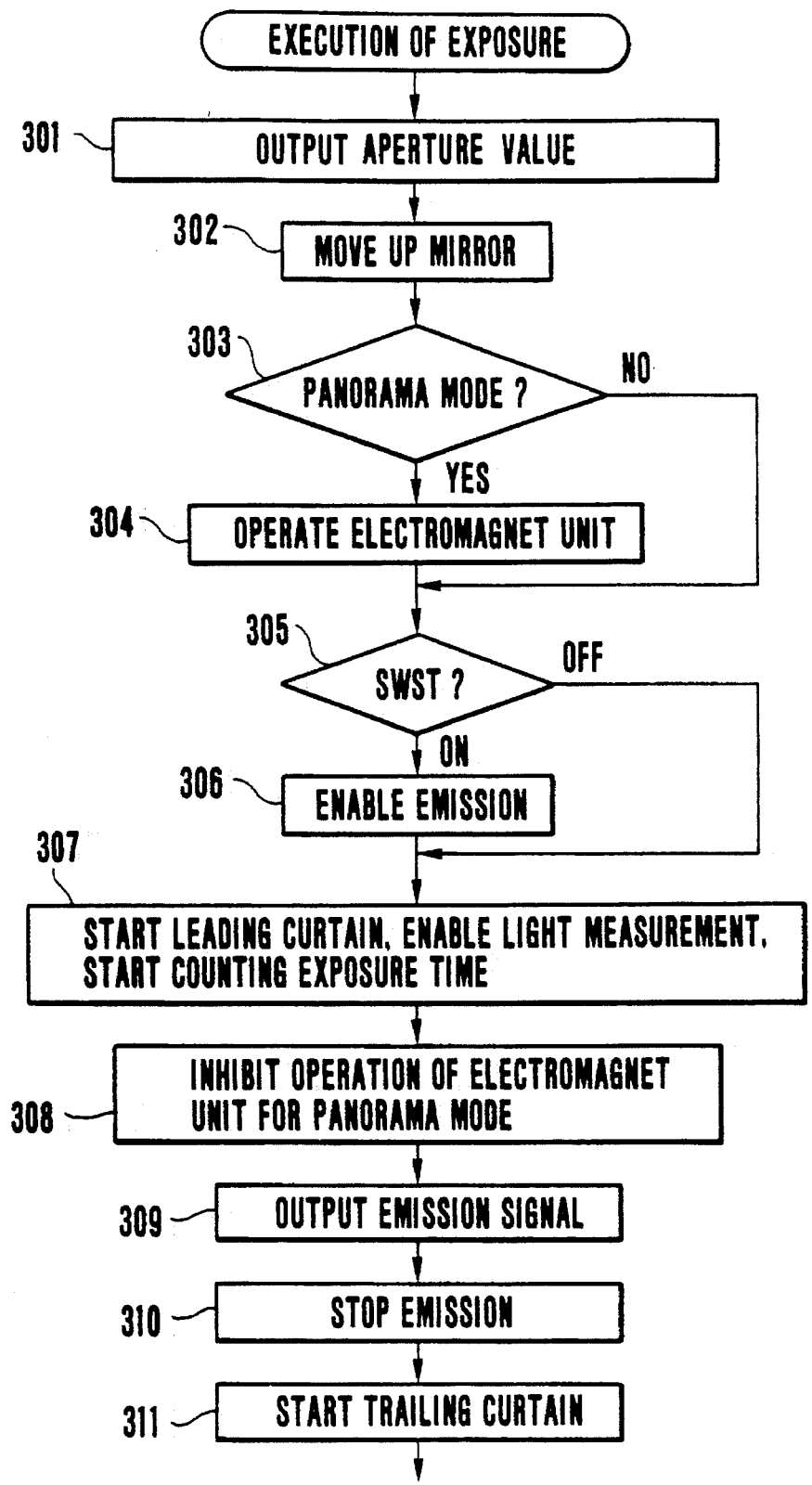
FIG. 11 is a flowchart of an exposure executing operation performed by the circuit shown in FIG. 2.

FIG. 11 is a detailed flowchart of Step #115 shown in FIG. 8. In Step #301, the aperture value is outputted to the diaphragm controlling part 55 to stop down the diaphragm. In Step #302, the motor 11 is driven in the forward direction to move up the mirror 23 and release the shutter from the charged state. When this operation is completed, the switch SWCG is turned off to stop the motor 11. At this time, the shutter blades are held only by controlling means such as an electromagnet which is not shown in FIG. 1, and the lever 24 which holds the masks 5 and 6 against a spring force is engaged with only the retaining lever 28. In Step #303, it is determined whether the panorama mode is set, and if the panorama mode is set, the process proceeds to Step #304, in which the electromagnet unit is operated. When the electromagnet unit is operated, the armature 27 rotates toward the left to rotate the retaining lever 28 toward the right, thereby releasing the engagement of the retaining lever 28 with the lever 24. The arms 7 and 8 respectively rotate toward the right and the left by the spring force, so that the masks 5 and 6 stop by making contact with the respective mask stoppers 4c and 4d. If it is determined in Step #303 that the panorama mode is not set, the process proceeds from Step #303 to Step #305. In Step #305, a decision is made as to the state of the switch SWST. If the switch SWST is on, an emission enable signal is outputted to the flash controlling part 56 in Step #306. If the switch SWST is off, the process proceeds to Step #307. Accordingly, subsequently, since no emission enable signal is present as long as the switch SWST is off (the flash unit is not popped up), even if an emission signal is outputted from the shutter controlling part 54 to the flash controlling part 56, emission of the flash unit is disabled. In Step #307, the leading curtain of the shutter is started and, at the same time, measurement of light reflected from a film surface is started, and time counting for shutter speed control is also started. When the leading curtain starts, the process proceeds to Step #308, in which the operation of the electromagnet unit for setting the panorama mode is inhibited. This inhibition is intended to prevent a phenomenon in which if the panorama mode is set (the switch SWPA is turned on) during an exposure whose exposure time is set to a long time, the masks 5 and 6 are operated midway during the exposure to cause an underexposure in the upper and lower portions of the image plane of the film, thus leading to a photography failure. Then, if the travel of the leading curtain comes to an end, an emission signal is outputted from the shutter controlling part 54 to the flash controlling part 56, and only when an emission enable signal is outputted, the flash unit emits flash light. In Step #310, when the amount of the measured light reflected from the film surface reaches a predetermined amount, the light measurement controlling part 53 outputs an emission stop signal to the flash controlling part 56 to stop the emission of the flash light. In Step #311, when the time counting for shutter speed control comes to an end, the trailing curtain starts, and then the process proceeds to Step #116 of the flowchart of FIG. 8.

Figure 12:
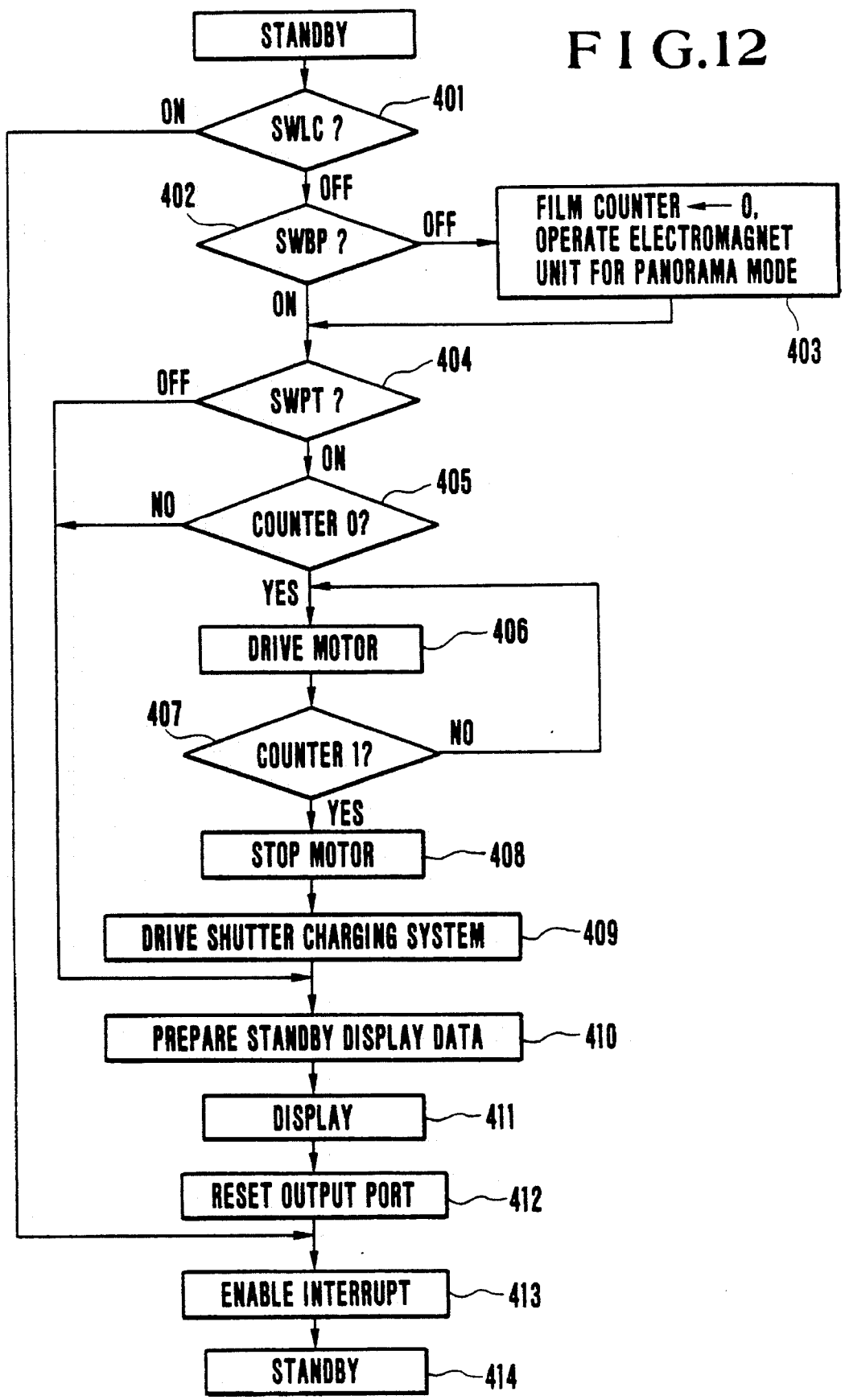
FIG. 12 is a flowchart of an automatic loading operation performed by the circuit shown in FIG. 2.

FIG. 12 shows a routine of automatic film loading which is executed during the operation of loading a film into the camera. When the camera is placed in the standby state, it is determined in Step #401 whether the switch SWLC is on or off. If the switch SWLC is on, since this indicates that the camera is held in the inoperative state by the operating member, the process proceeds to Step #413 without performing anything. If the switch SWLC is off, the process proceeds to Step #402. In Step #402, it is determined whether the back lid is open or closed, on the basis of the state of the switch SWBP. If the switch SWBP is off, since this indicates that the back lid is open, the process proceeds to Step #403. In Step #403, the content of the film counter is reset to 0 and the electromagnet unit for switching the exposure size (for setting the panorama size) is operated so that the exposure opening 2 (3a, 4a) is covered by the masks 5 and 6 to protect the shutter blades. After that, the process proceeds to Step #404. If the switch SWBP is on in Step #402, since this indicates that the back lid is closed, the process proceeds to Step #404 for the purpose of making a decision as to the presence or absence of the film. In Step #404, a decision is made as to the state of the switch SWPT. If the switch SWPT is on since this indicates that a film cartridge is loaded, the process proceeds to Step #405 and reading from the film counter is performed. If the switch SWPT is off in Step #404, since this indicates that no film cartridge is loaded, the process proceeds to Step #410 and standby display data is prepared. In Step #405, reading from the film counter is performed, and if the count value of the film counter is not "0", it is determined that the film cartridge is loaded (there remain unexposed frames), and the process proceeds to Step #410 and standby display data is prepared. If the count value of the film counter is "0", the process proceeds to Step #406 for the purpose of performing automatic loading of the film. In Step #406, the motor 11 is driven to start preliminary winding of the film, and the motor 11 continues to be driven until the count value of the film counter reaches "1" in Step #407. If the count value of the film counter reaches "0" in Step #407, the motor 11 is stopped in Step #408. In Step #409, the motor 11 is driven in the forward direction for the purpose of the masks 5 and 6 for the panorama mode, thereby retracting the masks 5 and 6 from the exposure opening 2 (3a, 4a). Further, the mirror 23 is driven and the shutter charging lever 10 is again charged. If it is determined in Step #409 that the switch SWCG is turned on, i.e., the shutter charging operation has been completed, standby display data is prepared in Step #410 and displayed in Step #411. In Step #412, the output port of the microcomputer 50 is reset, and in Step #413, the interrupt applied to the interrupt terminal IN1 or IN2 is enabled. In Step #414, the camera is set to its photography-possible standby state.

Figure 13:
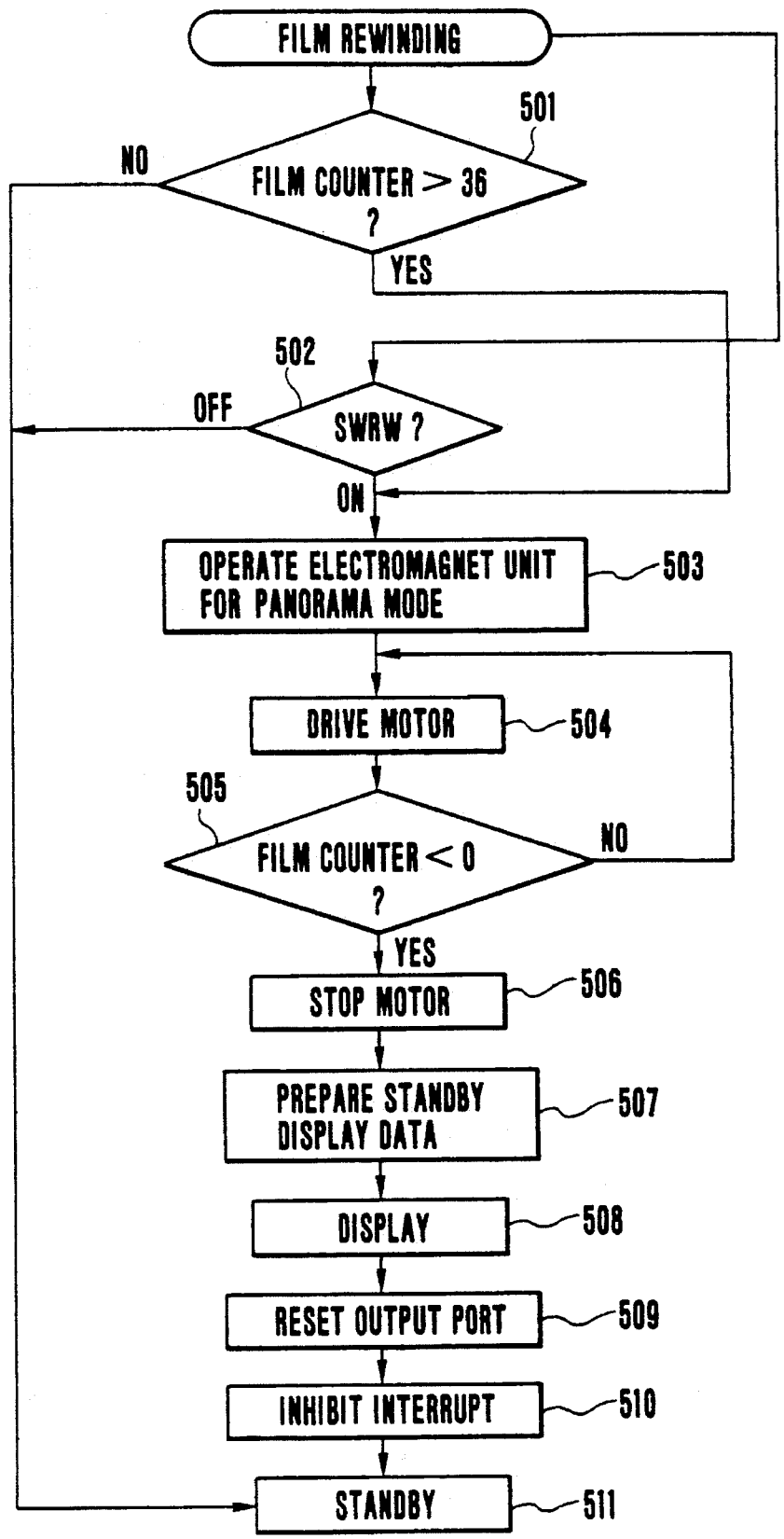
FIG. 13 is a flowchart of a film rewinding operation performed by the circuit shown in FIG. 2.

FIG. 13 is a routine showing the sequence of film rewinding. There are two ways of starts of the film rewinding sequence. One way is a sequence start which is executed by reading the number of exposed frames counted by the film counter in Step #501, and if the count value of the film counter exceeds 36, the process proceeds to Step #503 and the film rewinding sequence is started. The other way is to turn on the switch SWRW by pressing a film rewinding button (not shown) at an intermediate step in the interrupt routine of the interrupt terminal IN1 shown in FIG. 6. In this sequence start, if the switch SWRW is turned on in Step #502, the process proceeds to Step #503 and the film rewinding sequence is started. When an instruction to start the film rewinding sequence is given, the electromagnet unit for switching the exposure size (for setting the panorama size) is operated in Step #503, so that the exposure opening 2 (3a, 4a) is covered by the masks 5 and 6. In Step #504, the motor 11 is driven to drive a film rewinding mechanism (not shown). In Step #505, the count value of the film counter is read, and if the count value of the film counter is not less than "0", the driving of the motor 11 is continued. If the count value of the film counter is less than "0", the process proceeds to Step #506, in which the driving of the motor 11 is stopped. In Step #507, standby display data is prepared, and in Step #508, the standby display data is displayed. In Step #509, the output port of the microcomputer 50 is reset, and in Step #510, the interrupt applied to the interrupt terminal IN1 is enabled. In Step #511, the camera is set to the standby state.

Figure 14:
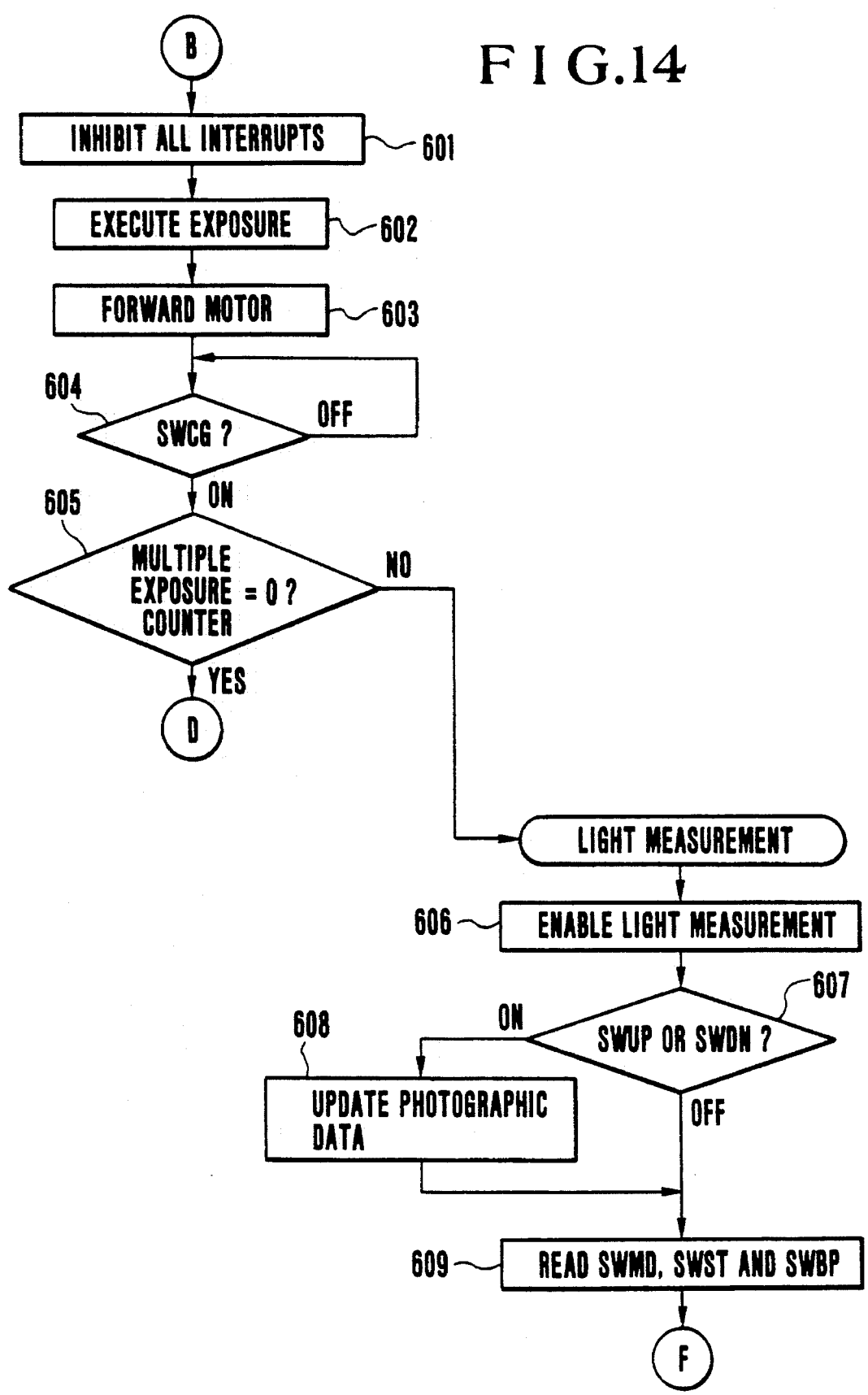
FIG. 14 is a flowchart of an exposure executing operation performed by the circuit of FIG. 2 during a multiple exposure photography mode.

FIG. 14 is a routine for setting the multiple exposure photography mode. If it is determined in Step #112 of FIG. 8 that the switch SWME is on (the multiple exposure photography mode is set), the process proceeds to Step #601 of FIG. 14, in which all interrupts are inhibited. In Step #602, exposure is executed in accordance with the value obtained in Step #106. After the exposure has been executed as described previously in connection with FIG. 11, the motor 11 is reversed to charge the shutter and the mirror 23 in Step #603. If it is determined in Step #604 that the switch SWCG is on, i.e., a shutter charging operation has been completed, the motor 11 is stopped, and in Step #605, reading of the count value of a multiple exposure counter is performed. If the count value of the multiple exposure counter is not "0", since this indicates that the multiple exposure photography mode is continued, the process proceeds to a terminal for starting light remeasurement. In Step #606, a light measurement enable signal is transmitted to the light measurement controlling part 53, and light remeasurement is started. In Step #607, it is determined whether the switch SWUP or SWDN is on. If the switch SWUP or SWDN is on, the process proceeds to Step #608, in which photographic data is updated in accordance with a selected photographic mode; for example, a shutter speed is updated in the case of the shutter priority mode or an aperture value is updated in the case of the aperture priority mode. Then, the process proceeds to Step #609. In Step #609, a decision is made as to the state of each of the switches SWMD, SWBP and SWST and interrupts from the switch SWAB and switch SWPA are inhibited. Then, the process proceeds to Step #105 shown in FIG. 8, and in Step #112, the multiple exposure photography sequence of FIG. 14 is executed. If the count value of the multiple exposure counter is "0" in Step #605, it is determined that the multiple exposure photography mode has ended, the process proceeds to the Step #118 of FIG. 8. In Step #118, film winding is performed, and in Step #127, the camera is set to the standby state, and the arrangement returns to the state shown in FIG. 1.

Figure 15:
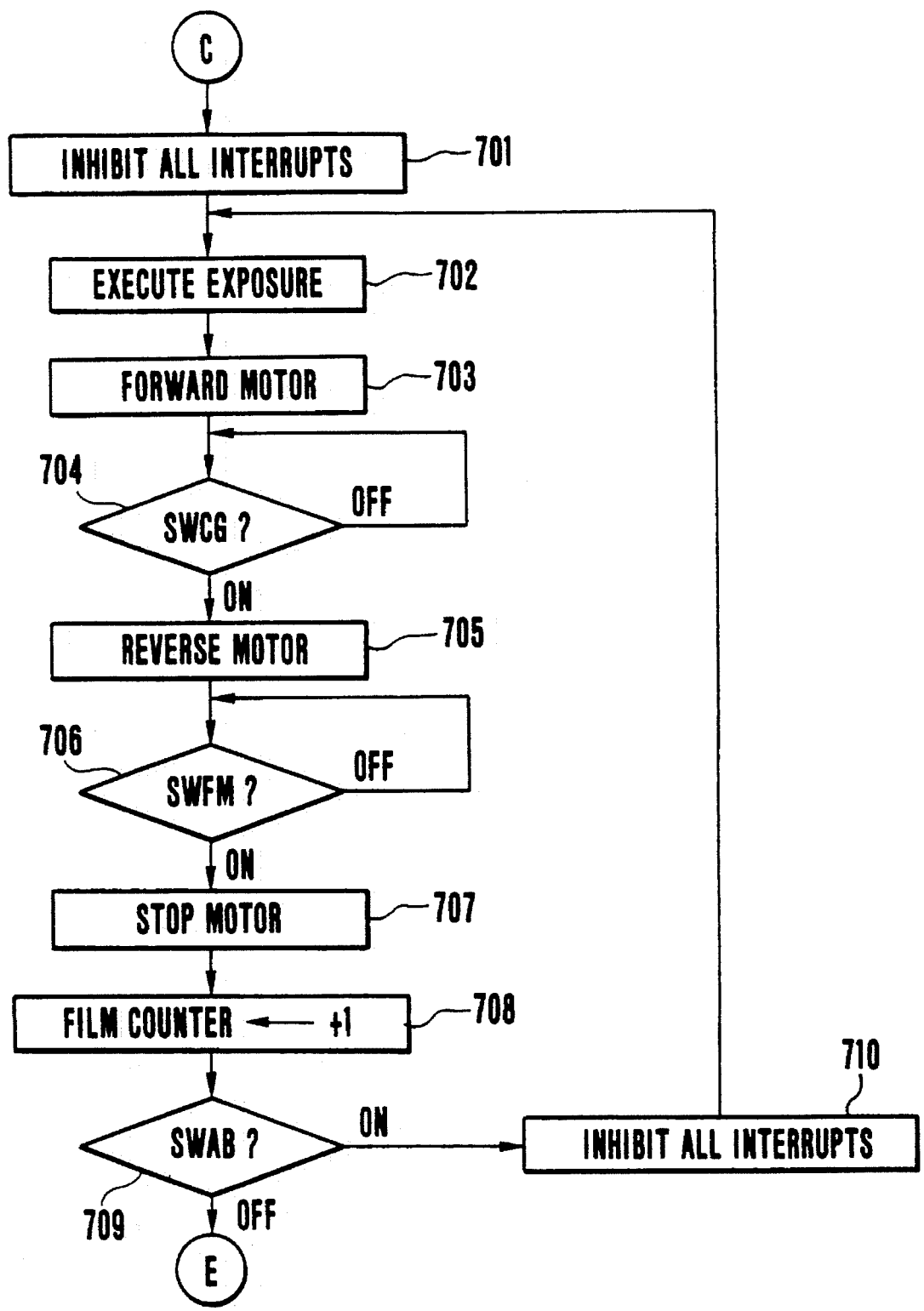
FIG. 15 is a flowchart of an exposure executing operation performed by the circuit of FIG. 2 during an automatic exposure bracketing (AEB) photography mode.

FIG. 15 shows a routine for setting the AEB photography mode. If it is determined in Step #113 that the switch SWAB is on (the AEB photography mode is set), the process proceeds to Step #701, in which all interrupts are inhibited. In Step #702, a first exposure in an exposure bracketing cycle is executed (with an exposure compensation of −2 EV relative to a correct exposure as shown in FIG. 4). After the first exposure has been executed, the motor 11 is reversed to charge the shutter and the mirror 23 in Step #703. If it is determined in Step #704 that the switch SWCG is on, i.e., a shutter charging operation has been completed, the motor 11 is reversed in Step #705. The planetary gear 13 revolves about the sun gear 12 and is made to be coupled to the film winding system (not shown), thereby winding the film. If it is determined in Step #706 that the switch SWFM is on, i.e., the film has been wound by one frame, the motor 11 is stopped in Step #707, and "1" is added to the count value of the film counter in Step #708. In Step #709, a decision is made as to the photographic status of the AEB mode, and if the exposure bracketing cycle (one exposure bracketing cycle with exposure compensations of −2 EV, 0 EV, +3 EV with respect to the correct exposure as shown in FIG. 4) has been completed in accordance with the setting, the process proceeds to Step #122 of FIG. 8. If the exposure bracketing cycle has not yet been completed in Stew #709, all interrupts are inhibited in Step #710. Then, the process returns to Step #702, in which a second exposure (correct exposure) and a third exposure (with an exposure compensation of −2 EV) in the exposure bracketing cycle are sequentially executed.

Figure 16:
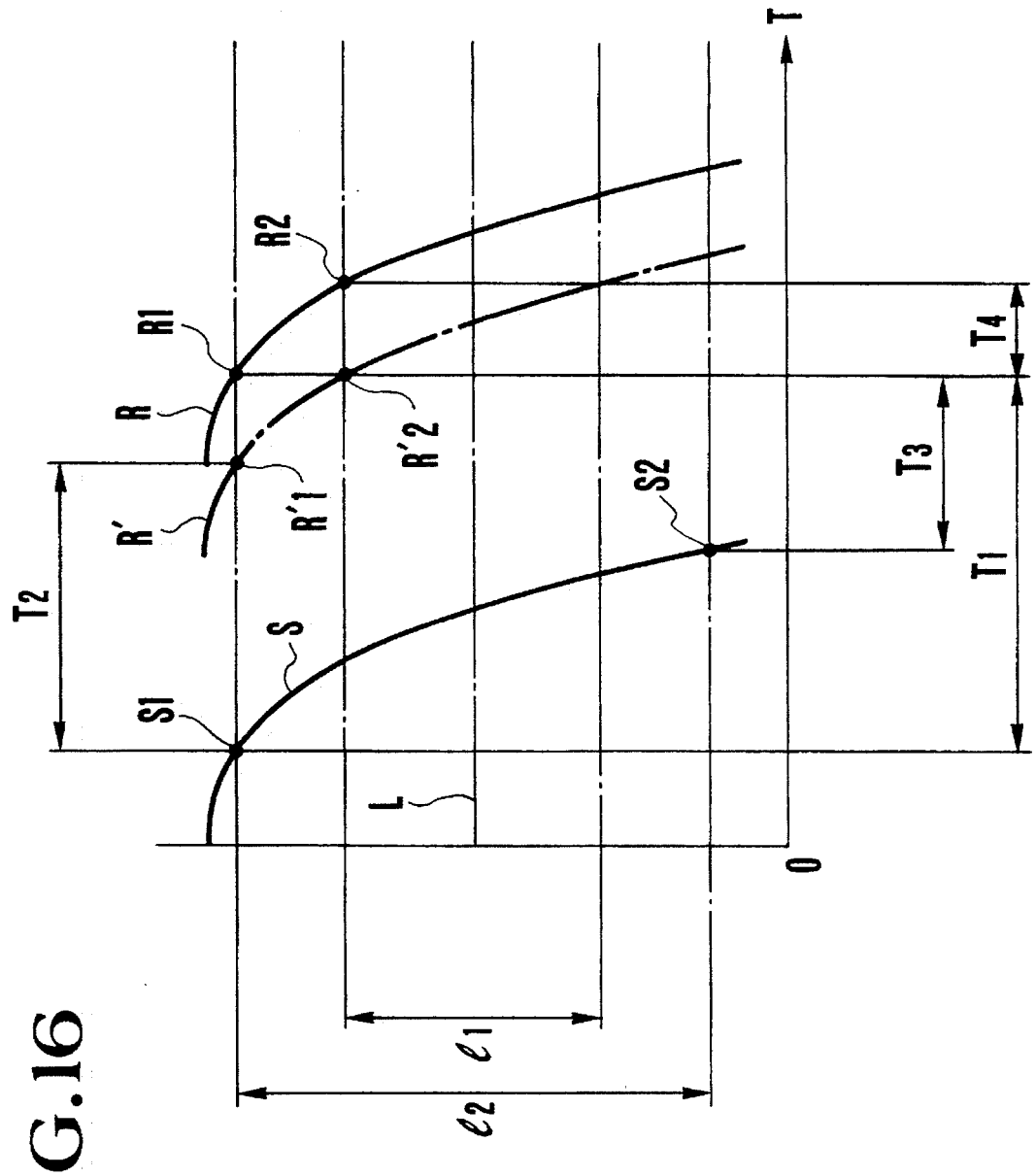
FIG. 16 is a graphic representation which serves to explain the respective operations of shutter leading and trailing curtains.

The reason why a flash sync shutter speed can be made higher during the panorama mode than during the fullsize mode will be described below with reference to FIG. 16. FIG. 16 is a graphic representation of the movements of the respective leading and trailing curtains of the shutter with time. The horizontal axis represents that time T elapses toward the right, while the vertical axis represents the vertical size of the exposure opening. In FIG. 16, "L" indicates a photographic optical axis, "$l_1$," indicates 13 mm which corresponds to the panorama size, and "$l_2$" indicates 24 mm which corresponds to the full size. "S" indicates the movement of the leading curtain, "R" indicates the movement of the trailing curtain in the case of the full-size photography, and "R'" indicates the movement of the trailing curtain in the case of the panorama photography. If it is assumed that the flash sync shutter speed used in the case of the full-size photography is ⅟₆₀ second, an interval T1 between a point S1 at which the leading curtain S enters the exposure area $l_2$ and a point R1 at which the trailing curtain R enters the exposure area $l_2$ is ⅟₆₀ second (exactly, ⅟₆₄ second equivalent to 15.63 msec). If the leading curtain travels through the exposure area $l_2$ in 9 msec, a shutter's full-open time T3 during which the flash unit is allowed to emit flash light is 15.63−9=6.63 msec. Since the flash unit receives an emission signal at a point S2 where the leading curtain S exits from the full-size exposure area $l_2$ and normally emits flash light for a maximum of 4–5 msec, it is sufficiently appropriate that the shutter's full-open time T3 is 6.63 msec, inclusive of a time margin. On the other hand, the exposure area of the panorama photography is reduced as shown at $l_1$. Accordingly, the point at which the trailing curtain R enters the exposure area shifts from R1 to R2, i.e., delays by time T4. The time T4 is selected to be approximately 4 msec in relation to the travel characteristics of the curtains. The shutter's full-open time at that time is T3+T4= 10.63 msec which is excessively long with respect to an actual flash emission time. If it is assumed that the flash sync shutter speed used in the panorama photography is ⅟₉₀ (exactly, ⅟₉₀.51 second=11.05 msec), the time taken up to a point R'2 where a trailing curtain R' enters the panorama exposure area $l_1$ is T2+T4=15.05 msec, and the shutter's full-open time T3 is 15.05−9=6.05 msec. This time "6.05 msec" is approximately 0.58 msec shorter than the shutter's full-open time T3 realized by the full-size photography. Although the timing of the curve R1 and that of the curve R'2 are not exactly the same, as shown in FIG. 16, it is possible to provide a sufficient time margin for the flash emission time. It is sufficient to provide the masks 5 and 6 provided between a shutter unit and the body with a strength approximately equivalent to the strength of the shutter blades, and the marks 5 and 6 and the arms 7 and 8 are approximately 0.1 mm in thickness. Accordingly, if partial spaces for the rotation supporting parts 7b and 8b are provided on the side of the body, it is not necessary to alter the positional relation between the body and the shutter.

Figure 17:
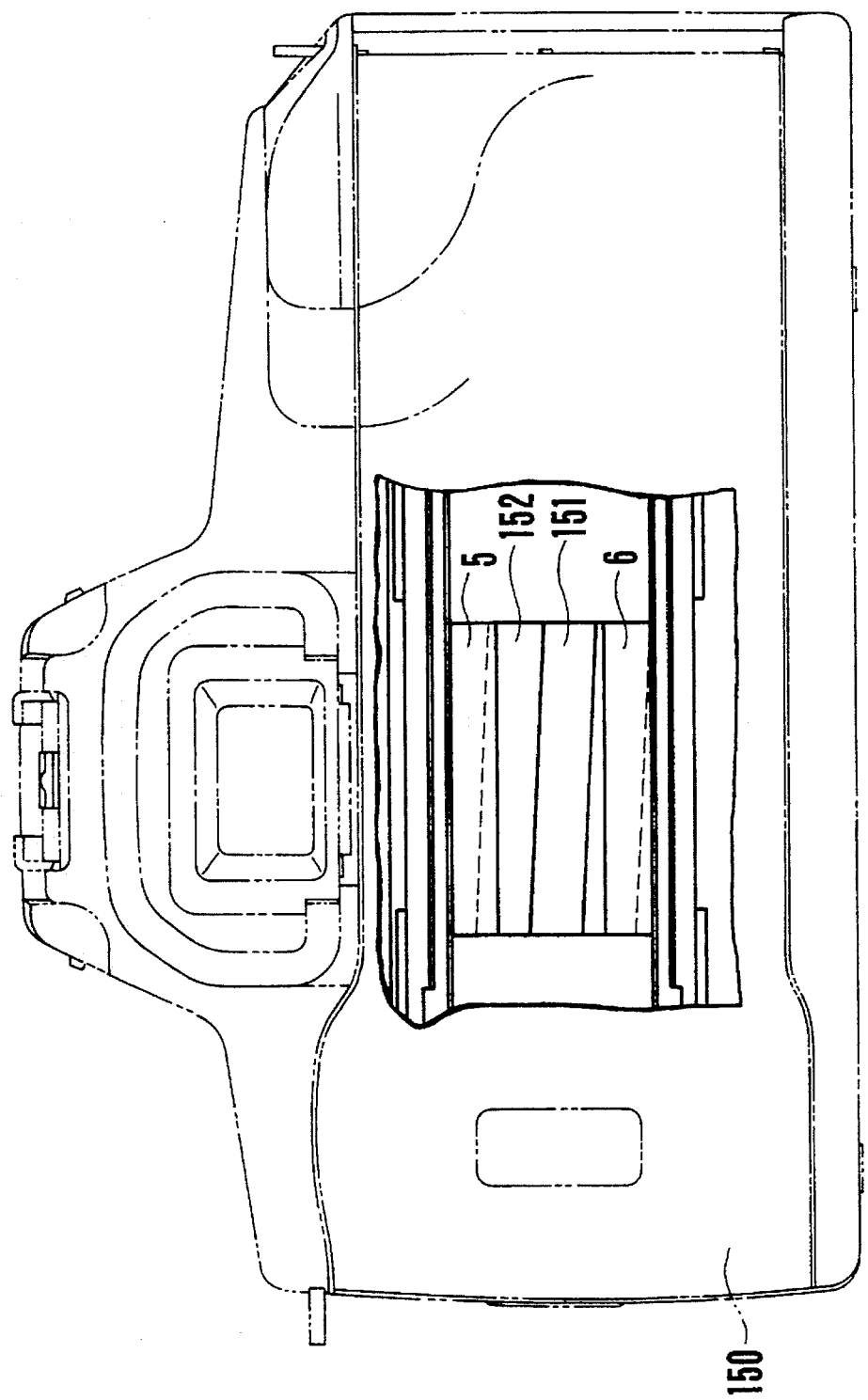
FIG. 17 is a schematic view showing the state of an exposure opening when the camera according to the first embodiment of the present invention is set to a panorama mode.
Figure 18:
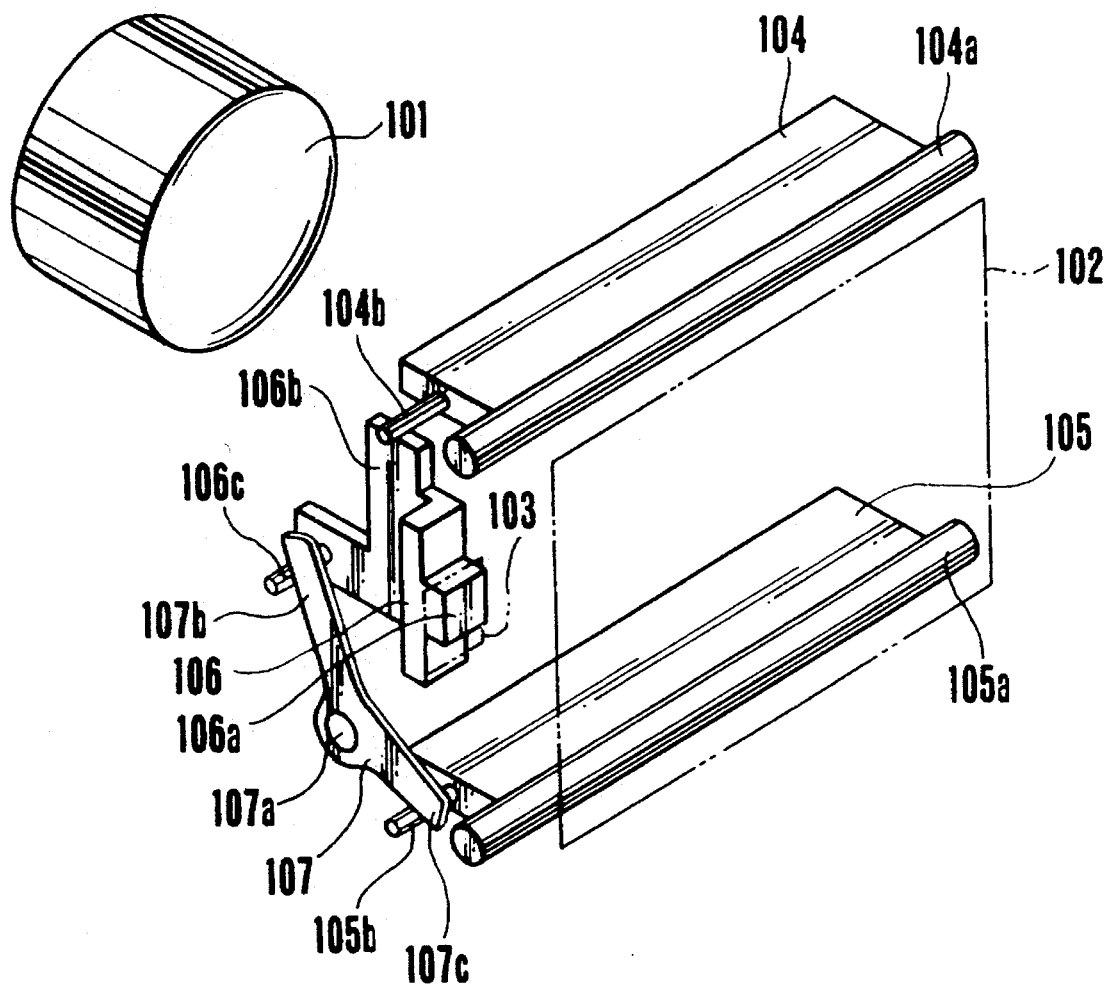
FIG. 18 is a schematic view showing an image-plane size setting means, an exposure opening and other associated elements provided in a conventional camera.

FIG. 17 shows the state of an exposure opening 151 of a camera 150, which exposure opening 151 is set to the panorama size according to the present invention. By operating an image-plane-size setting means, it is possible to cover approximately ½ of the exposure opening 151 with the masks 5 and 6, whereby shutter blades 152 can be protected.

Figure 19:
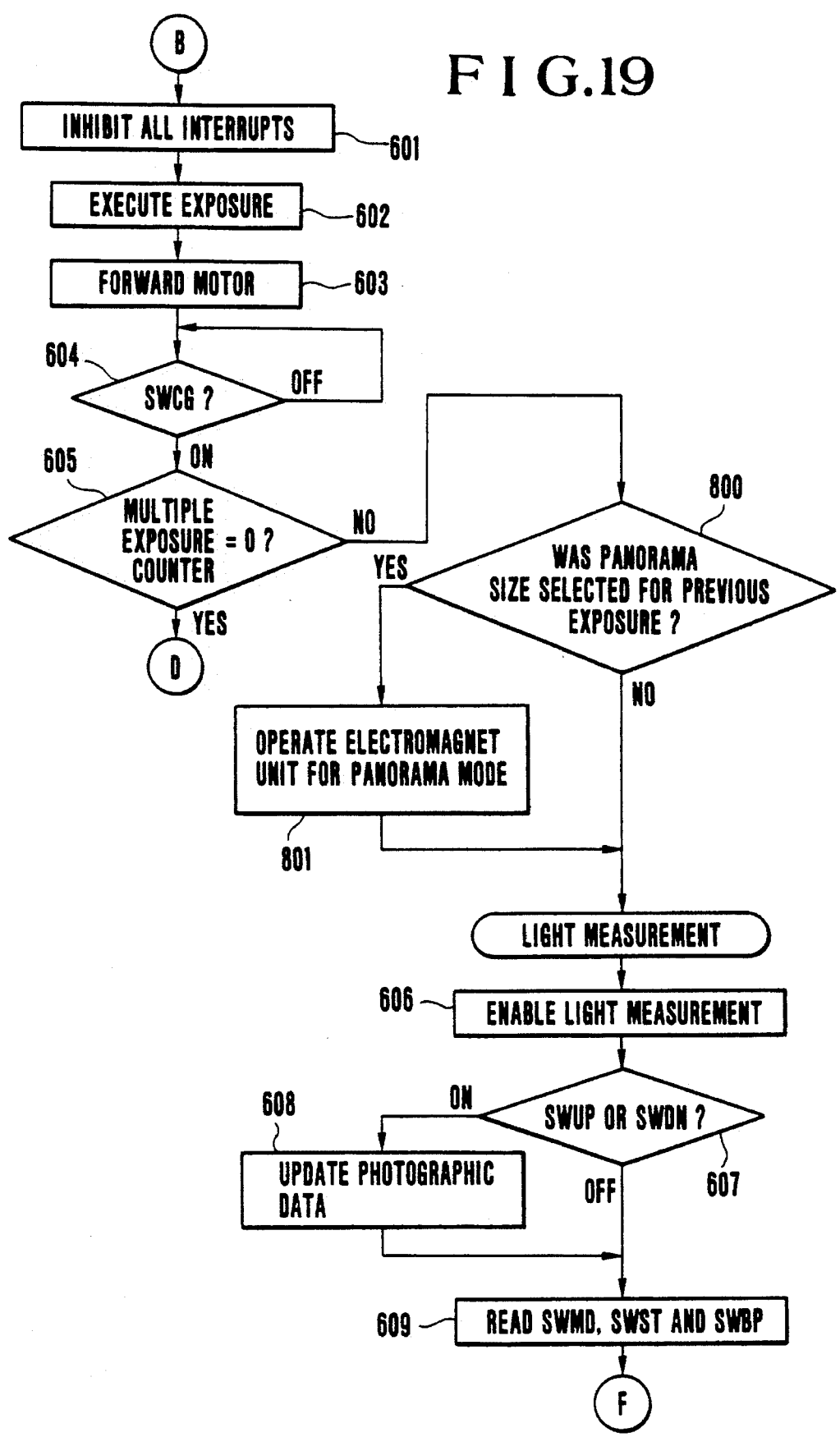
FIG. 19 is a flowchart of an exposure executing operation performed during a multiple exposure photography mode, showing a second embodiment of the present invention.
Figure 20:
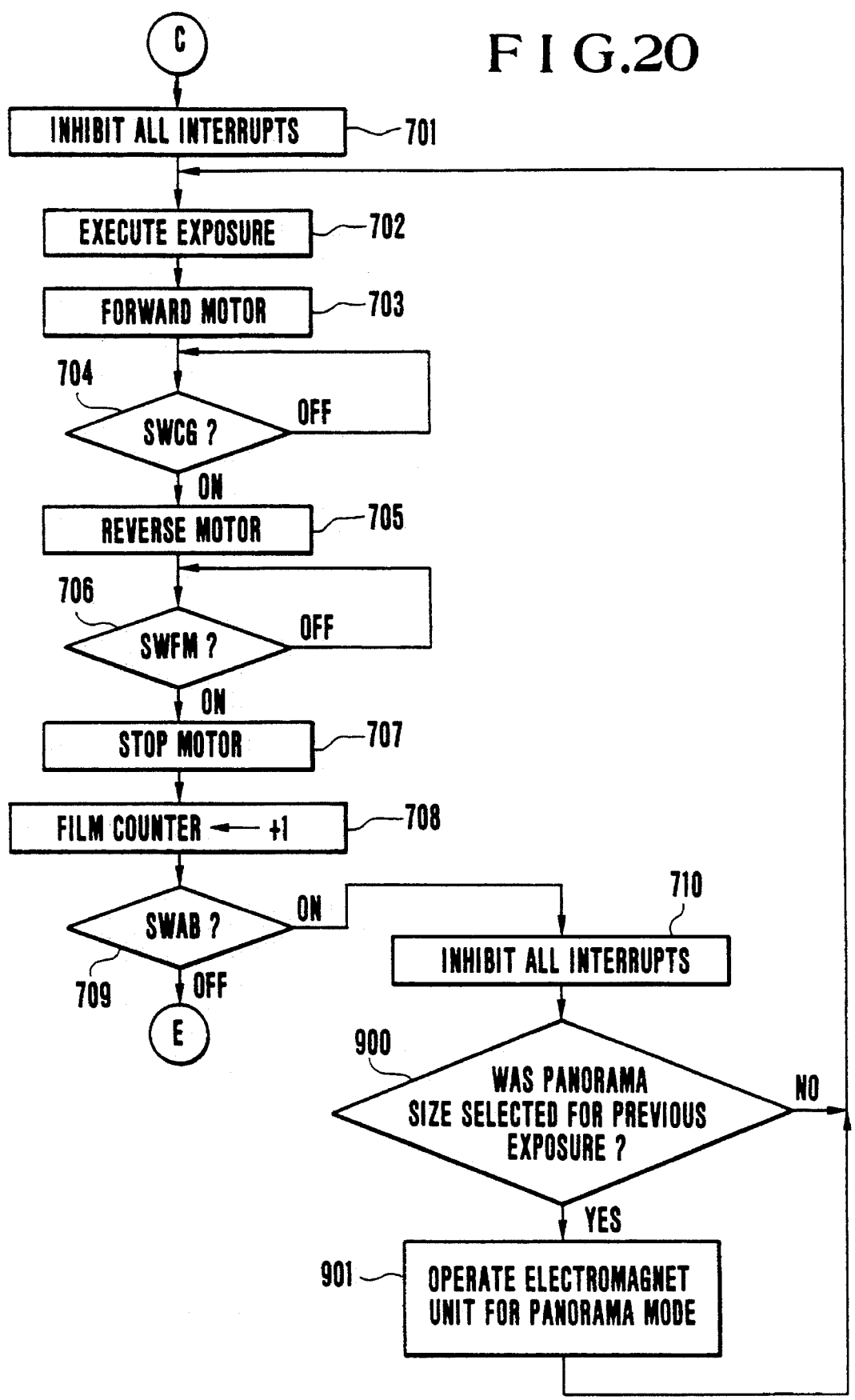
FIG. 20 is a flowchart of an exposure executing operation performed during an AEB photography mode, showing the second embodiment of the present invention.

A second embodiment of the present invention will be described below with reference to FIGS. 19 and 20. FIG. 19 shows a multiple exposure photography sequence according to the second embodiment, and FIG. 20 shows an AEB exposure photography sequence according to the second embodiment.

The multiple exposure photography sequence shown in FIG. 19 will be described below. The multiple exposure photography sequence shown in FIG. 19 is a partial modification of the multiple exposure photography sequence, shown in FIG. 14, according to the first embodiment. In FIG. 19, the same step numbers are used to denote steps which are similar in function to those shown in FIG. 14, and detailed description thereof is omitted. In FIG. 19, newly added steps are Steps #800 and #801. In the shown flowchart, if it is determined in step #605 that the count value of the counter is not "0", i.e., the multiple exposure photography mode is continued, the process proceeds to Step #800. In Step #800, it is determined which exposure size was used for the previous exposure operation in the multiple exposure photography mode, and the process branches on the basis of the result of the decision. Specifically, if the normal size was used for the previous exposure operation, the process proceeds to a terminal for starting light remeasurement. If the panorama size was used for the previous exposure operation, the process proceeds to Step #801. In Step #801, the electromagnet unit for setting the panorama size is operated so that the upper and lower portions of the exposure opening 2 (3a, 4a) are again covered by the masks 5 and 6. After that, the process executes the light remeasurement. In the embodiment shown in FIG. 19, if the multiple exposure photography is started with the normal size, midway switching of the normal size to the panorama size is inhibited. If the multiple exposure photography is started with the panorama size, it is possible to permit the panorama-size exposure to be executed until the end of the multiple exposure photography.

The AEB photography sequence shown in FIG. 20 will be described below. The AEB photography sequence shown in FIG. 20 is a partial modification of the AEB photography sequence, shown in FIG. 15, according to the first embodiment. In FIG. 20, the same step numbers are used to denote steps which are similar in function to those shown in FIG. 15, and detailed description thereof is omitted. In FIG. 20, newly added steps are Steps #900 and #901. In the flowchart of FIG. 20, if it is determined in Step #709 that an exposure bracketing cycle in the AEB photography mode has not yet ended, the process proceeds to Step #900 via Step #710 in which all interrupts are inhibited. In Step #900, it is determined which exposure size was used for the previous exposure operation in the AEB photography mode, and the process branches on the basis of the result of the decision. Specifically, if the normal size was used for the previous exposure operation, the process proceeds to Step #702 to perform the next exposure bracketing cycle. However, if the panorama size was used for the previous exposure operation, the process proceeds to Step #901. In Step #901, the electromagnet unit for setting the panorama size is operated so that the upper and lower portions of the exposure opening 2 (3a, 4a) are again covered by the masks 5 and 6. After that, the process proceeds to Step #702, in which the next exposure bracketing cycle is performed. In the embodiment shown in FIG. 20, if the AEB photography is started with the normal size, midway switching of the normal size to the panorama size is inhibited. If the AEB photography is started with the panorama size, it is possible to permit the panorama-size exposure to be executed until the end of the AEB photography.

As is apparent from the foregoing description, the camera according to the above-described embodiments can achieve the following advantages.

(1) It is possible to prevent light rays from leaking from between shutter blades by covering the photographic exposure opening with the light blocking members by means of the aforesaid image-plane-size setting means during driving of the film transporting mechanism (particularly, during automatic film loading and film winding).

(2) While the shutter is operating during photography, even if the operating member for operating the image-plane-size setting means is operated, an operation of the image-plane-size setting means is inhibited. Accordingly, it is possible to realize photography free from failure, particularly during low-shutter-speed photography.

(3) By covering the photographic exposure opening with the light blocking members by means of the aforesaid image-plane-size setting means when the back lid is open, it is possible to protect the shutter blades when the back lid is opened for the purpose of film loading.

(4) As long as a special photography mode is set, such as the multiple exposure photography mode or the automatic exposure bracketing photography mode, even if the operating member for operating the image-plane-size setting means is operated, changing of an image plane size setting is inhibited. Accordingly, it is possible to realize photography free from failure, whereby it is possible to sufficiently utilize the effect of the special photography mode.

What is claimed is:

1. A camera comprising:
   a) an exposure area switching mechanism for switching an exposure area by operation of an electrically-controllable actuator in response to an operation by a user;
   b) exposure operation means for executing an exposure operation; and
   c) control means for inhibiting, during the exposure operation of said exposure operation means, the operation of said actuator of said exposure area switching mechanism in response to the operation by the user.

2. A camera according to claim 1, wherein said exposure area switching mechanism switches said exposure area by a movement made by a light blocking member in response to the operation of said actuator.

3. A camera according to claim 2, wherein an electromagnet is used as said actuator.

4. A camera according to claim 1, wherein said exposure area switching mechanism switches said exposure area by said actuator being operated by a circuit including a microcomputer.

5. A camera according to claim 1, wherein said exposure area switching mechanism includes a circuit for electrically detecting an operation of an operating member and operating said actuator.

6. A camera according to claim 5, wherein said circuit is capable of memorizing a state of a switching of said exposure area.

7. A camera according to claim 1, further comprising a display device for displaying a state of said exposure area switched by said exposure area switching mechanism.

8. A camera according to claim 7, wherein said display device has a display panel, a display as to a switching of said exposure area and a display of other exposure information being simultaneously provided in a display area of said display panel.

9. A camera according to claim 1, wherein said exposure operation means includes a shutter device, said control means inhibiting said exposure area from being switched over a time interval of from a start to an end of an exposure based on an operation of said shutter device.

10. A camera according to claim 2, wherein said exposure operation means includes a shutter device, said light blocking member being movably mounted on said shutter device.

11. A camera according to claim 4, wherein said control means inhibits the operation of said actuator under program control of said microcomputer.

12. A camera according to claim 5, wherein said exposure area switching mechanism switches said exposure area by said actuator being operated by a circuit including a microcomputer.

13. A camera according to claim 12, wherein said control means inhibits the operation of said actuator under program control of said microcomputer.

14. A camera according to claim 5, further comprising a display device for displaying a state of said exposure area switched by said exposure area switching mechanism, said display device providing a display for informing a photographer that even if the photographer operates said operating member, said control means inhibits a switching of said exposure area.

15. A camera comprising:
   a) an exposure area switching mechanism for switching an exposure area by operation of an electrically-controllable actuator in response to an operation by a user;
   b) multiple exposure operation means for executing a multiple exposure operation; and
   c) control means for inhibiting, during a time interval in which said :exposure operation means executes said multiple exposure operation, an operation of said actuator of said exposure area switching mechanism in response to the operation by the user.

16. A camera according to claim 15, wherein said exposure area switching mechanism switches said exposure area by a movement made by a light blocking member in response to the operation of said actuator.

17. A camera according to claim 16, wherein an electromagnet is used as said actuator.

18. A camera according to claim 15, wherein said exposure area switching mechanism switches said exposure area by said actuator being operated by a circuit including a microcomputer.

19. A camera according to claim 15, wherein said exposure area switching mechanism includes a circuit for electrically detecting an operation of an operating member and operating said actuator.

20. A camera according to claim 15, wherein said time interval in which said exposure operation means executes said multiple exposure operation corresponds to a state previous to an advancement of a film to a next frame.

21. A camera according to claim 20, wherein said multiple exposure operation means is capable of setting the number of times of exposures for one multiple exposure cycle to three or more, the advancement of the film to the next frame being executed upon completion of a multiple exposure operation for the set number of times of exposures for one multiple exposure cycle.

22. A camera according to claim 18, wherein said multiple exposure operation means is capable of setting the number of times of exposures for one multiple exposure cycle to three or more, the advancement of the film to the next frame being executed upon completion of a multiple exposure operation for the set number of times of exposures for one multiple exposure cycle.

23. A camera according to claim 22, wherein said circuit is capable of memorizing a state of a switching of said exposure area, and is further capable of memorizing the remaining number of times of exposures for said multiple exposure operation.

24. A camera according to claim 15, further comprising a display device for displaying a state of said exposure area switched by said exposure area switching mechanism.

25. A camera according to claim 24, wherein said display device has a display panel, a display as to a switching of said exposure area and a display of other exposure information being simultaneously provided in a display area of said display panel.

26. A camera according to claim 16, wherein said light blocking member is movably mounted on a shutter device.

27. A camera according to claim 18, wherein said control means inhibits the operation of said actuator under program control of said microcomputer.

28. A camera according to claim 19, further comprising a display device for displaying a state of said exposure area switched by said exposure area switching mechanism, said display device providing a display for informing a photographer that even if the photographer operates said operating member, said control means inhibits a switching of said exposure area.

29. A camera comprising:
a) an exposure area switching mechanism for switching an exposure area by operation of an electrically-controllable actuator in response to an operation by a user;
b) automatic exposure bracketing operation means for executing an automatic exposure bracketing operation in which a plurality of times of continuous exposures are performed while varying an amount of exposure; and
c) control means for inhibiting, during a time interval in which said automatic exposure bracketing operation means executes said automatic exposure bracketing operation, the operation of said actuator of said exposure area switching mechanism in response to the operation by the user.

30. A camera according to claim 29, wherein said exposure area switching mechanism switches said exposure area by a movement made by a light blocking member in response to the operation of said actuator.

31. A camera according to claim 30, wherein an electromagnet is used as said actuator.

32. A camera according to claim 29, wherein said exposure area switching mechanism switches said exposure area by said actuator being operated by a circuit including a microcomputer.

33. A camera according to claim 29, wherein said exposure area switching mechanism includes a circuit for electrically detecting an operation of an operating member and operating said actuator.

34. A camera according to claim 29, wherein said time interval in which said automatic exposure bracketing operation means executes said automatic exposure bracketing operation corresponds to a time interval which is taken from an execution of an exposure starting operation until a completion of a set plurality of times of exposures which are continuously performed while varying said amount of exposure.

35. A camera according to claim 29, further comprising a display device for displaying a state of said exposure area switched by said exposure area switching mechanism.

36. A camera according to claim 35, wherein said display device has a display panel, a display as to a switching of said exposure area and a display of other exposure information being simultaneously provided in a display area of said display panel.

37. A camera according to claim 30, wherein said light blocking member is movably mounted on a shutter device.

38. A camera according to claim 32, wherein said control means inhibits the operation of said actuator under program control of said microcomputer.

39. A camera according to claim 33, further comprising a display device for displaying a state of said exposure area switched by said exposure area switching mechanism, said display device providing a display for informing a photographer that even if the photographer operates said operating member, said control means inhibits a switching of said exposure area.

40. A camera comprising:
a) an exposure area switching mechanism for switching an exposure area by an actuating operation of an actuator which is electrically controllable;
b) film advancement means for advancing a film; and
c) control means for causing said exposure area switching mechanism to forcedly operate, during an operation of said film advancement means.

41. A camera according to claim 40, wherein said exposure area switching mechanism switches said exposure area by a movement made by a light blocking member in response to the actuating operation of said actuator.

42. A camera according to claim 41, wherein an electromagnet is used as said actuator.

43. A camera according to claim 41, wherein said control means, during an operation of said film advancement means, causes said light blocking member to move, thereby switching said exposure area so that said exposure area is reduced in size.

44. A camera according to claim 43, wherein the operation of said film advancement means is a continuous winding operation for continuously winding the film immediately after a film cartridge is loaded.

45. A camera according to claim 43, wherein the operation of said film advancement means is a rewinding operation for rewinding the film.

46. A camera according to claim 40, wherein said exposure area switching mechanism switches said exposure area by said actuator being operated by a circuit including a microcomputer.

47. A camera according to claim 40, further comprising a display device for displaying a state of said exposure area switched by said exposure area switching mechanism.

48. A camera according to claim 47, wherein said display device has a display panel, a display as to a switching of said exposure area and a display of other exposure information being simultaneously provided in a display area of said display panel.

49. A camera comprising:
a) an exposure area switching mechanism for switching an exposure area by an actuating operation of an actuator which is electrically controllable;
b) a back lid which can be opened and closed;
c) detecting means for detecting whether said back lid is opened; and
d) control means for causing said exposure area switching mechanism to forcedly operate, when said detecting means detects that said back lid is opened.

50. A camera according to claim 49, wherein said exposure area switching mechanism switches said exposure area by a movement made by a light blocking member in response to the actuating operation of said actuator.

51. A camera according to claim 50, wherein an electromagnet is used as said actuator.

52. A camera according to claim 50, wherein said control means, when it is detected that said back lid is opened, causes said light blocking member to move, thereby switching said exposure area so that said exposure area is reduced in size.

53. A camera according to claim 49, wherein said exposure area switching mechanism switches said exposure area by said actuator being operated by a circuit including a microcomputer.

54. A camera according to claim 49, further comprising a display device for displaying a state of said exposure area switched by said exposure area switching mechanism.

55. A camera according to claim 54, wherein said display device has a display panel, a display as to a switching of said exposure area and a display of other exposure information being simultaneously provided in a display area of said display panel.

56. A camera, comprising:
 a) an exposure area switching mechanism for switching an exposure area by operation of an electrically-controllable actuator in response to an operation by a user; and
 b) control means for controlling said actuator so as to inhibit the operation of said actuator in response to the operation by the user on the basis of an operation state of the camera.

57. A camera according to claim 56, wherein said exposure area switching mechanism switches said exposure area by a movement made by a light blocking member in response to the operation of said actuator.

58. A camera according to claim 57, wherein an electromagnet is used as said actuator.

59. A camera according to claim 56, wherein said exposure area switching mechanism switches said exposure area by said actuator being operated by a circuit including a microcomputer.

60. A camera according to claim 56, wherein said exposure area switching mechanism includes a circuit for electrically detecting an operation of an operating member and operating said actuator.

61. A camera according to claim 60, wherein said circuit is capable of memorizing a state of a switching of said exposure area.

62. A camera according to claim 56, further comprising a display device for displaying a state of said exposure area switched by said exposure area switching mechanism.

63. A camera according to claim 62, wherein said display device has a display panel, a display as to a switching of said exposure area and a display of other exposure information being simultaneously provided in a display area of said display panel.

64. A camera according to claim 57, wherein said light blocking member is movably mounted on a shutter device.

65. A camera according to claim 56, further comprising a display device for displaying a state of said exposure area switched by said exposure area switching mechanism, said display device providing a display for informing a photographer that even if the photographer operates an operating member, a switching of said exposure area has been executed by said control means.

66. A camera according to claim 56, further comprising another actuator different from said actuator, said exposure area switched by said actuator being switched to a previous state by an actuating operation of said another actuator.

67. A camera according to claim 66, wherein said another actuator also serves as a driving source for executing a camera operation.

68. A camera according to claim 67, wherein said camera operation includes a preparatory operation previous to an exposure operation.

* * * * *

UNITED STATES PATENT AND TRADEMARK OFFICE
CERTIFICATE OF CORRECTION

PATENT NO. : 5,479,227
DATED : December 26, 1995
INVENTOR(S) : Toshio MATSUMOTO

Page 1 of 2

It is certified that error appears in the above-indentified patent and that said Letters Patent is hereby corrected as shown below: On title page,

ITEM [56] - References Cited:

"0332176 2/1991 Japan" should read --3-32176 2/1991 Japan--.

COLUMN 1:

Line 10, "cam" should read --camera--.

COLUMN 3:

Line 61, "image-plane size" should read --image-plane-size--.

COLUMN 6:

Line 32, "terminal." should read --terminal--.

COLUMN 7:

Line 34, ""o"." should read --"□".--;
Line 39, ""o"" should read --"□"--; and
Line 40, "≠" should read --+3--.

COLUMN 8:

Line 8, ""o"" should read --"□"--;
Line 13, ""o"" should read --"□"--;
Line 40, "Of" should read --of--; and,
Line 47, "On," should read --on--.

UNITED STATES PATENT AND TRADEMARK OFFICE
CERTIFICATE OF CORRECTION

PATENT NO. : 5,479,227

DATED : December 26, 1995

INVENTOR(S) : Toshio MATSUMOTO

It is certified that error appears in the above-indentified patent and that said Letters Patent is hereby corrected as shown below:

COLUMN 10:

Line 8, "With" should read --with--.

COLUMN 13:

Line 48, "starts of" should read --starting--.

COLUMN 15:

Line 45, "$^1/_{90.}51$" should read --$^1/_{90.51}$--.

COLUMN 18:

Line 29, ":exposure" should read --exposure--; and
Line 30, "an" should read --the--.

Signed and Sealed this

Eighteenth Day of June, 1996

Attest:

BRUCE LEHMAN

Attesting Officer     Commissioner of Patents and Trademarks